(12) United States Patent
Tsai

(10) Patent No.: US 8,000,545 B2
(45) Date of Patent: Aug. 16, 2011

(54) METHOD FOR ACCESSING IMAGE DATA AND METHOD FOR ACCESSING YUV420 IMAGE DATA

(75) Inventor: Jiann-Jong Tsai, Hsinchu County (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 906 days.

(21) Appl. No.: 11/962,624

(22) Filed: Dec. 21, 2007

(65) Prior Publication Data

US 2008/0240593 A1    Oct. 2, 2008

(30) Foreign Application Priority Data

Dec. 22, 2006    (TW) .............................. 95148423 A

(51) Int. Cl.
*G06K 9/46*    (2006.01)
(52) U.S. Cl. ........ 382/238; 382/289; 382/167; 382/296; 345/619; 345/649; 345/659; 345/571

(58) Field of Classification Search .................. 382/238, 382/289, 167, 296; 358/213, 1.94, 474, 44, 358/14, 167, 140, 138, 133; 345/571, 658, 345/474, 659, 619, 649, 689
See application file for complete search history.

(56) References Cited

U.S. PATENT DOCUMENTS

| 7,511,722 | B1 * | 3/2009 | Ollmann ....................... 345/649 |
| 2007/0019005 | A1 * | 1/2007 | van Baarsen et al. ......... 345/649 |
| 2009/0295817 | A1 * | 12/2009 | Yu et al. ....................... 345/571 |

* cited by examiner

*Primary Examiner* — Brian Q Le
*Assistant Examiner* — Mekonen Bekele
(74) *Attorney, Agent, or Firm* — J.C. Patents

(57) ABSTRACT

A method for accessing image data and a method for accessing YUV420 image data are disclosed. The method for accessing image data uses two different approaches to a buffer for accessing the JPEG image data, so that the method can achieve instant JPEG image data compression with only one buffer.

16 Claims, 16 Drawing Sheets

METHOD FOR ACCESSING IMAGE DATA AND METHOD FOR ACCESSING YUV420 IMAGE DATA

CROSS-REFERENCE TO RELATED APPLICATION

This application claims the priority benefit of Taiwan application serial no. 95148423, filed on Dec. 22, 2006. The entirety the above-mentioned patent application is hereby incorporated by reference herein and made a part of specification.

BACKGROUND OF THE INVENTION

1. Field of the Invention

The present invention generally relates to a method for accessing image data, and more particularly to a method which requires only one buffer for instantly compressing JPEG image data.

2. Description of Related Art

Generally, charge coupled devices (CCDs) and complementary metal-oxide semiconductors (CMOSs) are often used as sensors for conventional digital cameras or cellular phone cameras. Such sensors typically output images with a line based raster scan module. However, when using a JPEG format image data compressing method, because of the block base used therein, e.g., compressing image data in a way of taking 8×8 pixels as a block for scanning, there needs an extra procedure for transferring the image data arrangement inserted between processes of the sensor outputting the image data and compressing the data in accordance with the JPEG format.

FIG. 1 illustrates a flowchart of a JPEG code transformation. Referring to FIG. 1, before finally obtaining compressed bitstream and further achieving the JPEG code transformation, the image data must be processed by steps including: step 101, color transfer; step 102, discrete cosine transfer; step 103, quantization; and step 104, encoding. However, because the image data have to be processed by the discrete cosine transfer step 102, the JPEG image data must be encoded in minimum coded unit (MCU) so as to achieve compressed bitstream wherein each MCU is a sub-image of 8×8 pixels.

When the image data are compressed with YUV420 compression format defined by JPEG, because of the definition of the YUV420 compression format, the image data are divided into many sub-blocks for JPEG compression.

FIG. 2 is a schematic diagram for illustrating the definition of the YUV420 compression format. As illustrated by FIG. 2, the YUV420 compression format is to obtain four Y component blocks of 8×8 pixels, one U component block of 8×8 pixels, and one V component blocks of 8×8 pixels from each image block of 16×16 pixels of the image data, wherein each image block does not overlap another image block. The Y component represents brightness of a pixel, while the U component and the V component represent a color tone and a color saturation of a pixel respectively. The sequence of the discrete cosine transfer process is Y11, Y12, Y21, Y22, U1, and V1 as illustrated in FIG. 2. Therefore, the YUV420 compression must be performed based on data of 16 lines to compress the JPEG image data.

Conventionally, a two-buffer structure, e.g., an A/B buffer structure, is often employed to convert arrangement of image data between line base and block base (MCU block). The foregoing A/B buffer structure is that when the image is being written into the A buffer, a JPEG engine obtains data from the B buffer for compression, and while the image data is being written into the B buffer, the JPEG engine obtains data from the A buffer for compression. When using an A/B buffer structure for processing a YUV420 compression, all buffer size needed thereby are 32 lines, which means a storage space defined by the 32 lines in the buffers.

FIG. 3 is a schematic diagram for illustrating a conventional A/B buffer structure. As shown in FIG. 3, the A buffer 301 and the B buffer 302 are both 16-line buffers. In such a structure, a user may use a switch 303 for determining to input image data of the raster scan sequence to the A buffer 301 or the B buffer 302, and use a switch 304 for determining to output pixel block data stored in the A buffer 301 or the B buffer 302. The user may also use vertical synchronous signals, horizontal synchronous signals, and clock signals to either have a writing address controller 305 to drive the A buffer 301 or the B buffer 302 to conduct a writing action of the image data of the raster scan sequence, or have a reading address controller 306 to drive the A buffer 301 or the B buffer 302 to conduct a reading action, i.e., outputting, of the pixel block image data.

Although, the A/B buffer structure can achieve instant JPEG compression, when applied in digital cameras or mobile communication, it is to be avoided to consume excessive power, and therefore a static random access memory (SRAM) must be used for storing the A/B buffer data. Unfortunately, doing so wastes precious SRAM resources. Taking a 1.3M sensor for example, a 12-line buffer requires about 30 Kbit SRAM, which is about 14% die cost of the entire chip. Accordingly, using the least buffers to achieve instant JPEG compression is a major concern currently for most manufacturers.

Besides, as to the design of the buffers themselves, because image data are input into the buffers (reading image data) and output from the buffer (writing image data) in different ways, the user must use such an A/B buffer structure. Therefore, when conducting a YUV420 compression, because of the JPEG definition, only after data of all 16 lines are read to the buffer (ready status), the compression can be conducted. In such a way, the JPEG compression is only to some degree instantly compressed when using the A/B buffer structure.

FIG. 4 is a schematic diagram for illustrating an image data of 640×480 pixels that is line base and after being YUV420 sampled. FIG. 5(a) is a schematic diagram for illustrating inputting image data to a 12-line buffer. FIG. 5(b) is a schematic diagram for illustrating outputting image data from a 12-line buffer. The image data of 640×480 pixels indicate a horizontal resolution of 640 pixels and a vertical resolution of 480 pixels of the image data. As shown in FIG. 4, the image data contain 480 lines of data, respectively line 1 through line 480. Because the image data of the 640×480 pixels as shown in FIG. 4 have been YUV420 sampled, therefore each line data presented in FIG. 4 and marked with odd numbers have a Y component, a U component and a V component, while each line data presented in FIG. 4 and marked with even numbers have only a Y component. FIGS. 5(a) and 5(b) illustrate buffers having storage spaces L1 through L16, each block in the storage spaces, such as the memory cell 501 and the half memory cell 502 shown in FIG. 5(a), and the memory cell 503 and the half memory cell 504 as shown in FIG. 5(b), can temporally store data of 8 pixels.

Line data 1 through 16 are written in sequence into the storage spaces L1 through L16. When all storage spaces in the buffer are filled by the image data, the JPEG engine starts to obtain the data therefrom in a way as shown as 505 in FIG. 5 to obtain data from data cells marked with 1 and 2 in storage spaces L1 through L16. Then the JPEG engine according to the way as illustrated by 505 obtains data from data cells marked with 3 and 4 in storage spaces L1 through L16. Likewise, data written in data cells marked with 5 through 80 in storage spaces L1 through L16 are obtained in similar way. Similarly as the foregoing description of line data 1 through 16, the buffer, the JPEG engine further temporarily store the line data 17 through 32, 33 through 48, 49 through 64, . . . , into the buffer till the line data 465 through 480 are output from the buffer. However, according to such an operation method, the line data 33 through 48 can be input into the buffer only after all line data 17 through 32 have been output from the buffer, which consumes a lot of time and limit the degree of instant JPEG compression. Similarly, the line data 33 through 48 can be input into the buffer only after all line data 17 through 32 have been output therefrom. As such, convention operation wastes a lot of time in waiting.

Furthermore, it can be learned from FIGS. 5(a) and 5(b), although the storage spaces are marked with L1 through L16, the storage spaces L2, L4, L6, L8, L10, L12, L14, and L16 store only Y component therein, so that the storage volume of storage spaces L2 and L4 are equivalent to any one of the storage spaces L1, L3, L5, L7, L9, L11, L13 and L15. Storage spaces L6 and L8, L10 and L12, L14 and L16 are similar to L2 and L4 as discussed above. Accordingly, the conventional technology requires a 24-line buffer, that is an A/B buffer, each of the A buffer and the B buffer has 12 lines, for instant JPEG compression in accordance with the features of reading/writing different SRAMs. As such, the conventional technology has relatively high production cost when adopting A/B buffer structures.

SUMMARY OF THE INVENTION

Accordingly, the present invention is directed to a method for accessing image data, which requires only one buffer for instantly compressing JPEG image data.

The present invention is further directed to a method for accessing YUV420 image data, which requires only one buffer for instantly compressing JPEG image data.

In accordance with the foregoing objects and other objects of the present invention, a method for accessing image data is provided. The image data include a plurality of image data matrix A, each image data matrix A including m rows of image data sub-matrix R. Each image data sub-matrix R includes n columns of image units a, and each image unit a includes p pixels. Each pixel is represented with a plurality of units of data, the plurality of units include a first unit, a second unit and a third unit, wherein data of the first unit of w rows of image data sub-matrixes require u rows (each row including n columns) of memory units b for storage, and data of the second unit and the third unit of the w rows of image data sub-matrixes requires v rows (each row including n columns) of the memory units b for storage, wherein $$A = \begin{bmatrix} R_1 \\ R_2 \\ \vdots \\ R_m \end{bmatrix} = \begin{bmatrix} a_{1,1} & a_{1,2} & \cdots & a_{1,n} \\ a_{2,1} & a_{2,2} & \cdots & a_{2,n} \\ \vdots & \vdots & & \vdots \\ a_{m,1} & a_{m,2} & \cdots & a_{m,n} \end{bmatrix},$$

wherein $R_i$ represents the $i^{th}$ row of image data sub-matrix R; $a_{i,j}$ represents the $i^{th}$ row and $j^{th}$ column image unit a, the method for accessing image data comprises the following steps:

(a) providing a matrix storage space B for temporarily storing the image data matrixes A, wherein the matrix storage space B comprises x rows of sub-matrix storage spaces S, each sub-matrix storage space S comprises y columns of the memory units b, wherein the matrix storage space B can also be described as comprising z columns of sub-matrix storage spaces C, each sub-matrix storage space C comprising x rows of sub-matrix storage spaces T, each sub-matrix storage space T comprises h columns of memory units b, wherein the matrix storage space C can also be described as comprising h columns of sub-matrix storage spaces D, wherein x=m*(u+v)/w, and when n*(1+v/u)/x is an integer, h=n*(1+v/u)/x, and when n*(1+v/u)/x is not an integer, h=INT(n*(1+v/u)/x)+1, wherein the function INT( ) adapted to obtain an integer portion of an input parameter, and when n/h is an integer, z=n/h, and when n/h is not an integer, z=INT(n/h)+1, and y=h*z, wherein $$B = \begin{bmatrix} S_1 \\ S_2 \\ \vdots \\ S_x \end{bmatrix} = \begin{bmatrix} b_{1,1} & b_{1,2} & \cdots & b_{1,y} \\ b_{2,1} & b_{2,2} & \cdots & b_{2,y} \\ \vdots & \vdots & & \vdots \\ b_{x,1} & b_{x,2} & \cdots & b_{x,y} \end{bmatrix} = [C_1 \ C_2 \ \cdots \ C_z]$$

$$C_q = \begin{bmatrix} T_1 \\ T_2 \\ \vdots \\ T_x \end{bmatrix} = \begin{bmatrix} b_{1,1} & b_{1,2} & \cdots & b_{1,h} \\ b_{2,1} & b_{2,2} & \cdots & b_{2,h} \\ \vdots & \vdots & & \vdots \\ b_{x,1} & b_{x,2} & \cdots & b_{x,h} \end{bmatrix} = [D_1 \ D_2 \ \cdots \ D_h],$$

wherein $S_k$ represents $k^{th}$ sub-matrix storage spaces S, $b_{k,l}$ represents the $k^{th}$ row and $l^{th}$ column memory unit b, $C_q$ represents the $q^{th}$ column of sub-matrix storage spaces C, and $T_k$ represents the $k^{th}$ row of sub-matrix storage spaces T;

(b) obtaining data of w rows of image data sub-matrixes R in the $e^{th}$ image data matrix A, and writing the data into (u+v) rows of the sub-matrix storage spaces S of the matrix storage space B;

(c) reading data of the $e^{th}$ image data matrix A from the sub-matrix storage space C of the matrix storage space B, wherein only after all data of the one column of sub-matrix storage spaces C are read out, data of another column of sub-matrix storage spaces C can be read;

(d) obtaining data of w rows of image data sub-matrixes R in the $(e+1)^{th}$ image data matrix A, and writing the data into the sub-matrix storage spaces C of the matrix storage space B; and (e) reading data of the $(e+1)^{th}$ image data matrix A from the (u+v) rows of sub-matrix storage space S of the matrix storage space B, wherein only after all data of the one group of (u+v) rows of sub-matrix storage space S are read out, data of another group of (u+v) rows of sub-matrix storage space S can be read, wherein e, h, i, j, k, l, m, n, p, q, x, y, and z are all natural numbers; w, u, v are all rational numbers; and i≦m j≦n, k≦x, l≦y, and q≦z.

In accordance with the foregoing objects and other objects of the present invention, a method for accessing YUV420 image data is provided. The YUV420 image data includes a plurality of image data matrixes A, each image data matrix A including m rows of image data sub-matrixes R, each image data sub-matrix R including n columns of image units a, each image unit a including p pixels, each pixel being represented with a plurality of units of data, the plurality of units including a first unit, a second unit and a third unit. Data of the first unit of w rows of image data sub-matrixes require u rows of memory units b for storage, and data of the second unit and the third unit of the w rows of image data sub-matrixes require v rows of the memory units b for storage, wherein $$A = \begin{bmatrix} R_1 \\ R_2 \\ \vdots \\ R_m \end{bmatrix} = \begin{bmatrix} a_{1,1} & a_{1,2} & \cdots & a_{1,n} \\ a_{2,1} & a_{2,2} & \cdots & a_{2,n} \\ \vdots & \vdots & & \vdots \\ a_{m,1} & a_{m,2} & \cdots & a_{m,n} \end{bmatrix},$$

wherein $R_i$ represents the $i^{th}$ row of image data sub-matrix R; $a_{i,j}$ represents the $i^{th}$ row and $j^{th}$ column image unit a, the method for accessing YUV420 image data comprising the following steps:

(f) providing a matrix storage space B for temporarily storing the image data matrixes A, wherein the matrix storage space B comprises x rows of sub-matrix storage spaces S, each sub-matrix storage space S comprises y columns of the memory units b, wherein the matrix storage space B can also be described as comprising z columns of sub-matrix storage spaces C, each sub-matrix storage space C comprising x rows of sub-matrix storage spaces T, each sub-matrix storage space T comprising h columns of memory units b, wherein the matrix storage space C can also be described as comprising h columns of sub-matrix storage spaces D, each matrix storage space C further comprises Y rows of sub-matrix storage spaces E, and each sub-matrix storage space E comprises 3 rows of sub-matrix storage spaces T, wherein x=m*(u+v)/w, and when n*(1+v/u)/x is an integer, h=n*(1+v/u)/x, and when n*(1+v/u)/x is not an integer, h=INT(n*(1+v/u)/x)+1, wherein the function INT( ) is adapted to obtain an integer portion of an input parameter, and when n/h is an integer, z=n/h, when n/h is not an integer, z=INT(n/h)+1, and y=h*z, when an arithmetical compliment of (2*h)/3Q is 0, then m1=Q and m2=Q; when an arithmetical compliment of (2*h)/3Q is 1, then m1=Q and m2=Q+1; and when an arithmetical compliment of (2*h)/3Q is 2, then m1=Q+1 and m=Q, wherein Q is a quotient of (2*h)/3, and when an arithmetical compliment of x/3 is 0, then Y=x/3, wherein $$B = \begin{bmatrix} S_1 \\ S_2 \\ \vdots \\ S_x \end{bmatrix} = \begin{bmatrix} b_{1,1} & b_{1,2} & \cdots & b_{1,y} \\ b_{2,1} & b_{2,2} & \cdots & b_{2,y} \\ \vdots & \vdots & & \vdots \\ b_{x,1} & b_{x,2} & \cdots & b_{x,y} \end{bmatrix} = [C_1 \; C_2 \; \cdots \; C_z],$$

$$C_q = \begin{bmatrix} T_1 \\ T_2 \\ \vdots \\ T_x \end{bmatrix}$$

$$= \begin{bmatrix} b_{1,1} & b_{1,2} & \cdots & \cdots & b_{1,m1} & b_{1,m1+1} & \cdots & b_{1,h} \\ b_{2,1} & b_{2,2} & \cdots & b_{2,m2} & b_{2,m2+1} & \cdots & \cdots & b_{2,h} \\ b_{3,1} & b_{3,2} & \cdots & \cdots & b_{3,m1} & b_{3,m1+1} & \cdots & b_{3,h} \\ b_{4,1} & b_{4,2} & \cdots & \cdots & b_{4,m1} & b_{4,m1+1} & \cdots & b_{4,h} \\ b_{5,1} & b_{5,2} & \cdots & b_{5,m2} & b_{5,m2+1} & \cdots & \cdots & b_{5,h} \\ b_{6,1} & b_{6,2} & \cdots & \cdots & b_{6,m1} & b_{6,m1+1} & \cdots & b_{6,h} \\ \vdots & \vdots & \vdots & & \vdots & \vdots & & \vdots \\ b_{x-2,1} & b_{x-2,2} & \cdots & \cdots & b_{x-2,m1} & b_{x-2,m1+1} & \cdots & b_{x-2,h} \\ b_{x-1,1} & b_{x-1,2} & \cdots & b_{x-1,m2} & b_{x-1,m2+1} & \cdots & \cdots & b_{x-1,h} \\ b_{x,1} & b_{x,2} & \cdots & \cdots & b_{x,m1} & b_{x,m1+1} & \cdots & b_{x,h} \end{bmatrix}$$

$$= [D_1 \; D_2 \; \cdots \; D_h]$$

$$= \begin{bmatrix} E_1 \\ E_2 \\ \vdots \\ E_Y \end{bmatrix},$$

$$E_k = \begin{bmatrix} T_{k-1} \\ T_k \\ T_{k+1} \end{bmatrix},$$

wherein $S_k$ represents $k^{th}$ sub-matrix storage spaces S, $b_{k,l}$ represents the $k^{th}$ row and $l^{th}$ column memory unit b, $C_q$ represents the $q^{th}$ column of sub-matrix storage spaces C, $D_q$ represents the $q^{th}$ column of sub-matrix storage spaces D; $T_k$ represents the $k^{th}$ row of sub-matrix storage spaces T; and $E_k$ represents the $k^{th}$ row of sub-matrix storage spaces E;

(g) obtaining data of w rows of image data sub-matrixes R in the $e^{th}$ image data matrix A, and writing the data into (u+v) rows of the sub-matrix storage spaces S of the matrix storage space B;

(h) reading data of the $e^{th}$ image data matrix A from the sub-matrix storage space C of the matrix storage space B, wherein only after all data of the one column of sub-matrix storage spaces C are read out, data of another column of sub-matrix storage spaces C can be read;

(i) obtaining data of w rows of image data sub-matrixes R in the $(e+1)^{th}$ image data matrix A, and writing the data into the sub-matrix storage spaces C of the matrix storage space B; and (i) reading data of the $(e+1)^{th}$ image data matrix A from the sub-matrix storage space S of the matrix storage space B, wherein e, h, I, j, k, l, m, n, p, q, x, y, z, m1, m2, and Q are all natural numbers; w, u, v are all rational numbers; and i≦m, j≦n, k≦x, l≦y, and q≦z.

According to an embodiment of the present invention, when writing data into the (u+v) rows of sub-matrix storage spaces S of the matrix storage space B, a sequence of writing the data into the memory unit bk,l increases from l=1 to l=n, and when reading the data from the sub-matrix storage spaces C of the matrix storage space B, the data are read from the sub-matrix storage spaces D.

According to an embodiment of the present invention, when writing data into the (u+v) rows of sub-matrix storage spaces S of the matrix storage space B, (u−v) rows of data of the first unit, and v rows of data of the second unit and the third unit are written starting from the $k^{th}$ row of sub-matrix storage spaces $S_k$, wherein k increases from k=1 to k=f, and v rows of data of the first unit are written starting from the g row of sub-matrix storage spaces $S_g$, wherein g increases from g=f+1 to g=x, wherein f=x*u/(u+v), and f and g are both natural numbers.

According to an embodiment of the present invention, when writing the data into the sub-matrix storage spaces C of the matrix storage space B, a sequence of data are written into the memory units $b_{k,l}$ is first increased l from l=1 to l=h, then k is increased, and when reading data from (u+v) rows of sub-matrix storage spaces S of the matrix storage space B, the data are read from corresponding memory units $b_{k,l}$ of the sub-matrix storage spaces C, and the reading sequence of the sub-matrix storage spaces C1 is increased q from q=1 to q=z.

According to an embodiment of the present invention, the (u−v) rows of data of the first unit and the v rows of data of the second and the third units are written into the memory units $b_{k-1,l}$ through $b_{k-1,m1}$ of the sub-matrix storage space $T_{k-1}$, $b_{k,l}$ through $b_{k,m2}$ of the sub-matrix storage space $T_k$, and $b_{k+1,l}$ through $b_{k+1,m1}$ of the sub-matrix storage space $T_{k+1}$ of the sub-matrix storage space E, and the v rows of data of the first unit are written into the memory units $b_{k-1,m1+1}$ through $b_{k-1,h}$ of the sub-matrix storage space $T_{k-1}$, $b_{k,m2+1}$ through $b_{k,h}$ of the sub-matrix storage space $T_k$, and $b_{k+1,m1+1}$ through $b_{k+1,h}$ of the sub-matrix storage space $T_{k+1}$ of the sub-matrix storage space E.

The method for accessing image data uses two different approaches to a buffer for accessing the JPEG image data, so that the method can achieve instant JPEG image data compression with only one buffer.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

Figure 5A:
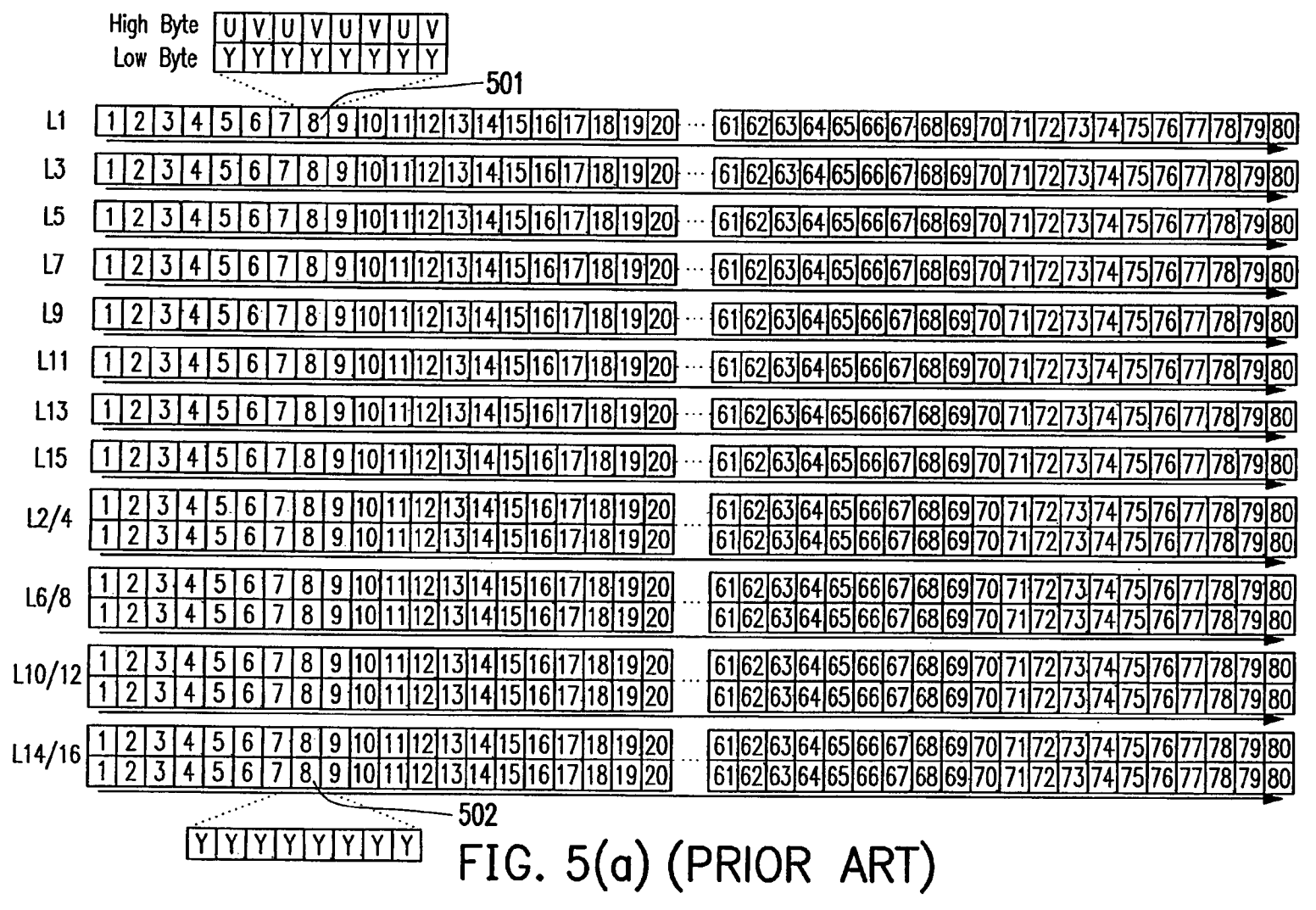
Figure 5B:
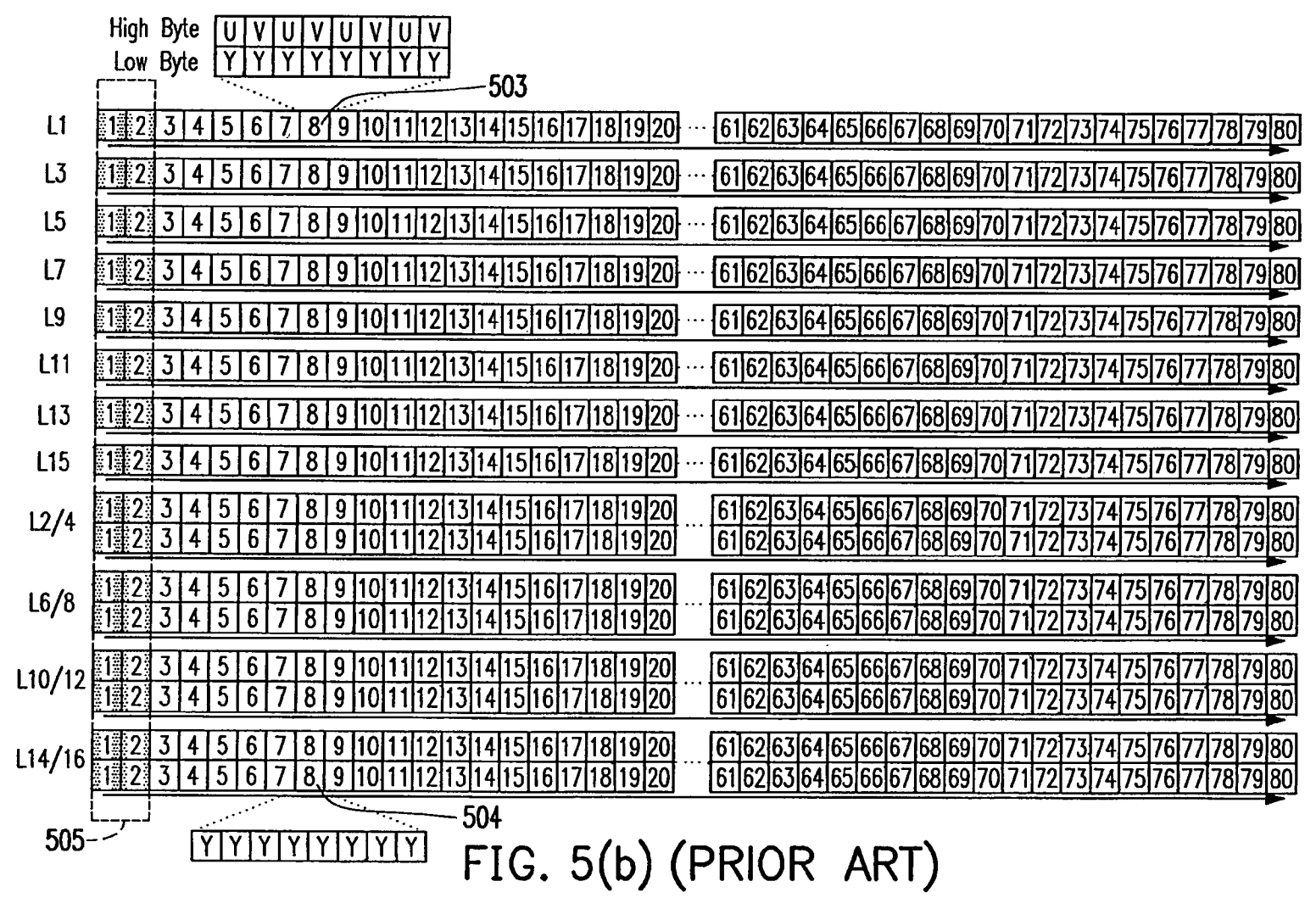

FIG. 5(a) is a schematic diagram for illustrating inputting image data to a 12-line buffer.

FIG. 5(b) is a schematic diagram for illustrating outputting image data from a 12-line buffer.

FIG. 8 is a schematic diagram illustrating a step 602 of a method according to an embodiment of the present invention.

FIG. 9 is a schematic diagram illustrating a step 602 of a method according to another embodiment of the present invention.

FIG. 10(a) is a schematic diagram showing 30 MCUs after being compressed according to an embodiment of the present invention.

FIG. 10(b) is a schematic diagram showing 60 MCUs after being compressed according to an embodiment of the present invention.

FIG. 11 is a schematic diagram illustrating a step 605 of a method according to an embodiment of the present invention.

FIG. 13 is a schematic diagram illustrating a step 1202 of a method according to another embodiment of the present invention.

FIG. 14(a) is a schematic diagram showing 30 MCUs after being compressed according to another embodiment of the present invention.

FIG. 14(b) is a schematic diagram showing 60 MCUs after being compressed according to another embodiment of the present invention.

FIG. 15 is a schematic diagram illustrating a step 1205 of a method according to another embodiment of the present invention.

DESCRIPTION OF THE EMBODIMENTS

Figure 1:
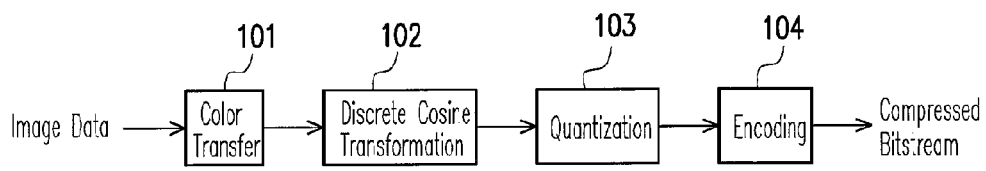
FIG. 1 illustrates a flowchart of a JPEG code transformation.
Figure 2:
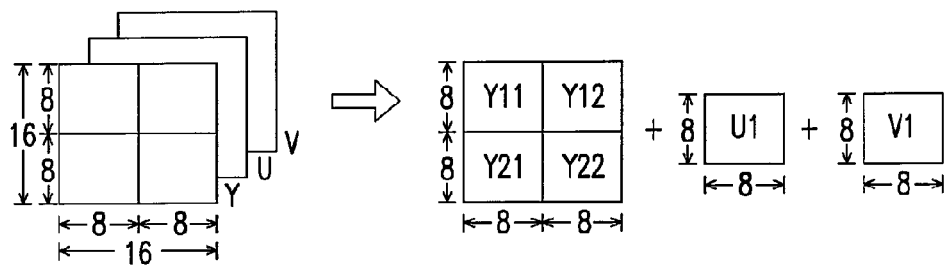
FIG. 2 is a schematic diagram for illustrating the definition of the YUV420 compression format.
Figure 3:
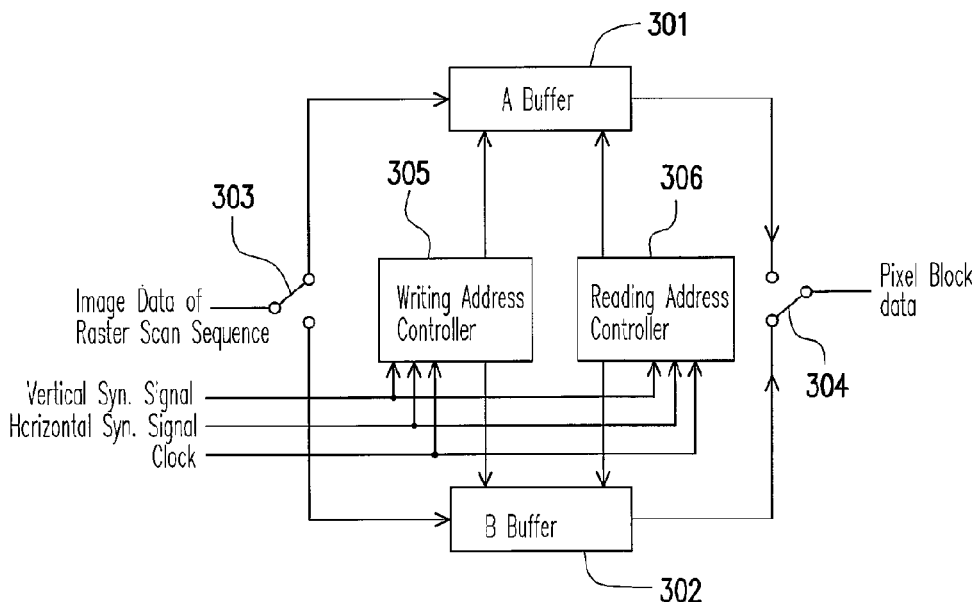
FIG. 3 is a schematic diagram for illustrating a conventional A/B buffer structure.
Figure 4:
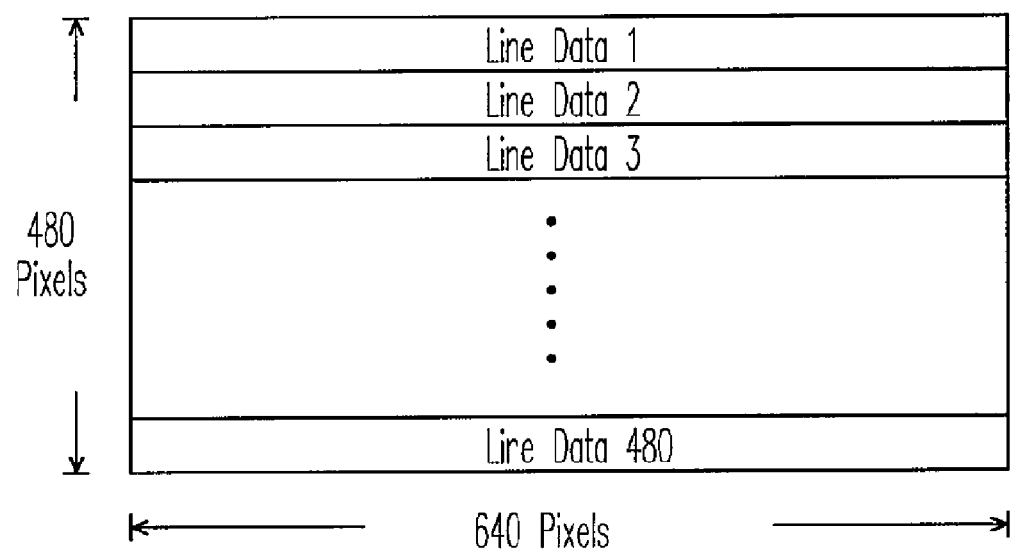
FIG. 4 is a schematic diagram for illustrating an image data of 640×480 pixels that is line base and after being YUV420 sampled.

Reference will now be made in detail to the present preferred embodiments of the invention, examples of which are illustrated in the accompanying drawings. Wherever possible, the same reference numbers are used in the drawings and the description to refer to the same or like parts.

Figure 6:
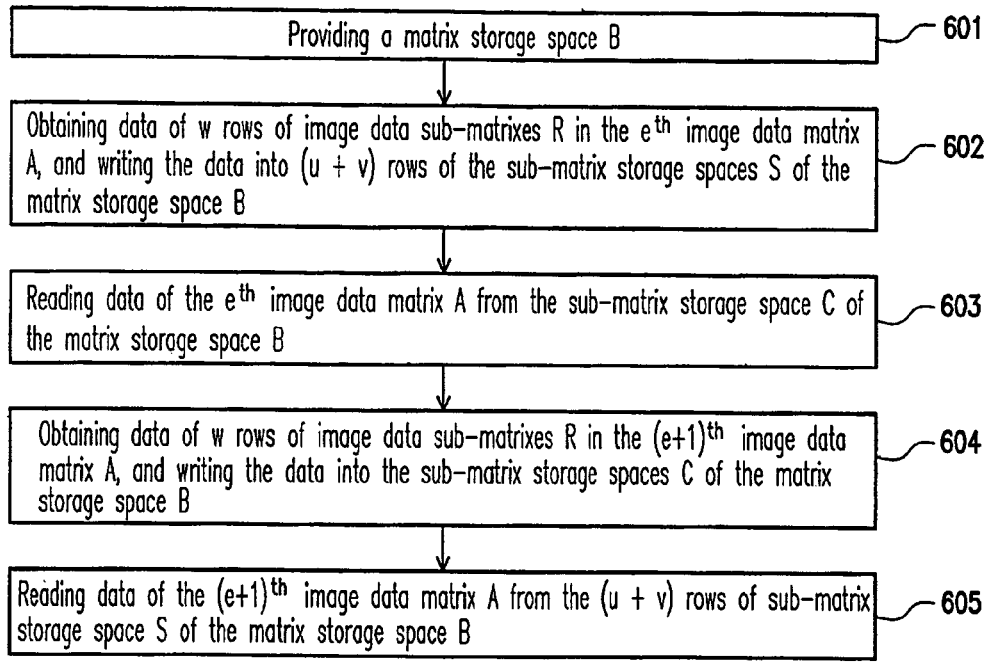
FIG. 6 is a flow chart for illustrating a method for accessing image data according to an embodiment of the present invention.
Figure 7:
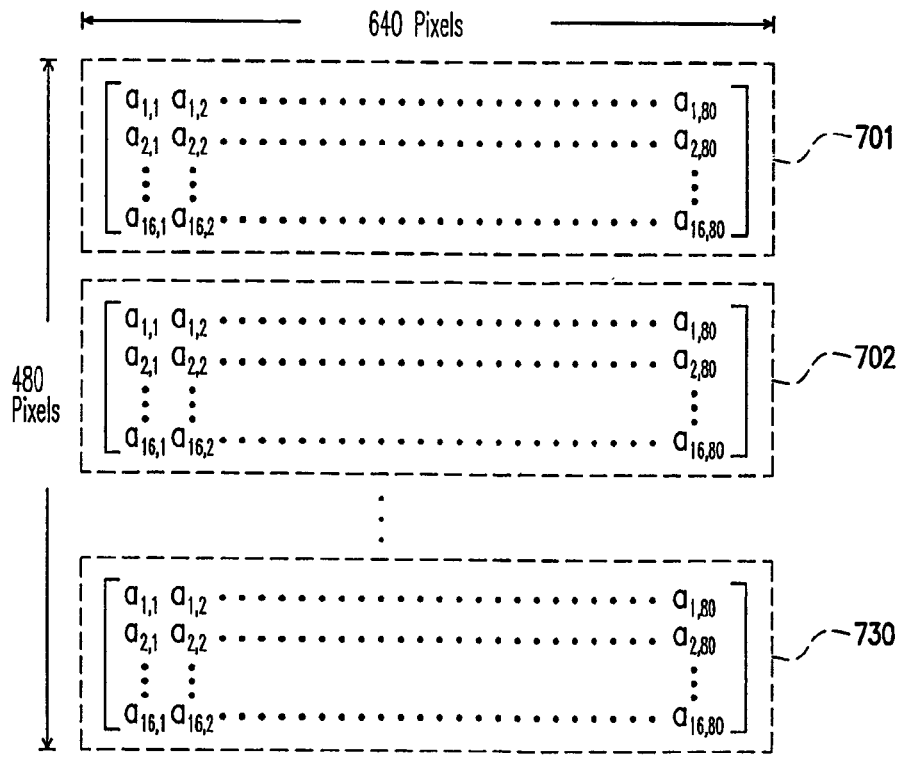
FIG. 7 is a schematic diagram illustrating image data including 30 image data matrixes A.

FIG. 6 is a flow chart for illustrating a method for accessing image data according to an embodiment of the present invention. FIG. 7 is a schematic diagram illustrating image data including 30 image data matrixes A. For the purpose of illustration, in the embodiment, the image data herein are exemplified as having a horizontal resolution of 640 pixels and a vertical resolution of 480 pixels, which are often called as 640×480 pixels image data, and the method according to the embodiment is to be illustrated with an example of JPEG format YUV420 compression.

Referring to FIGS. 6 and 7, the 640×480 pixels image data include 30 image data matrixes A, 701, 702 ... 730, as shown in FIG. 7. Each image data matrix A includes 16-row image data sub-matrix R, and each image data sub-matrix R includes an 80-column pixel unit a, the image data matrix A being presented as:

$$A = \begin{bmatrix} R_1 \\ R_2 \\ \vdots \\ R_{16} \end{bmatrix} = \begin{bmatrix} a_{1,1} & a_{1,2} & \cdots & a_{1,80} \\ a_{2,1} & a_{2,2} & \cdots & a_{2,80} \\ \vdots & \vdots & & \vdots \\ a_{16,1} & a_{16,2} & \cdots & a_{15,80} \end{bmatrix},$$

wherein $R_i$ represents the image data sub-matrix R of the $i^{th}$ row; $a_{i,j}$ represents the image unit a of the $i^{th}$ row and the $j^{th}$ column. Each image unit a in the image data matrix A includes 8, i.e., p, pixels, and each pixel is represented by data of three different units including Y image component data of a first unit, U image component data of a second unit, and V image component data of a third unit. The Y image component data of the first unit of each two, i.e., w, rows of image data matrixes R is needed to be written in 1, i.e., u, row of 80 columns of memory units b. The U image component data of the second unit and the V image component data of the third unit of each two row of image data sub-matrixes R are required to be written in a 0.5 row of 80 columns of memory units b. The method for accessing image data includes following steps.

First, a buffer is provided. As shown in step 601 of FIG. 6, a matrix storage space B is provided for temporarily storing the image data matrixes A. The matrix storage space B includes x rows of sub-matrix storage spaces S, and each sub-matrix storage space S includes y columns of memory units b. The matrix storage space B is also illustrated as including z columns of sub-matrix storage spaces C, each sub-matrix storage space C includes x rows of sub-matrix storage spaces T, and each sub-matrix storage space T includes h columns of memory units b. Each sub-matrix storage space C is also illustrated as including h columns of sub-matrix storage spaces D, wherein:

$$B = \begin{bmatrix} S_1 \\ S_2 \\ \vdots \\ S_x \end{bmatrix} = \begin{bmatrix} b_{1,1} & b_{1,2} & \cdots & b_{1,y} \\ b_{2,1} & b_{2,2} & \cdots & b_{2,y} \\ \vdots & \vdots & & \vdots \\ b_{x,1} & b_{x,2} & \cdots & b_{x,y} \end{bmatrix} = [C_1 \ C_2 \ \ldots \ C_z],$$

-continued $$C_q = \begin{bmatrix} T_1 \\ T_2 \\ \vdots \\ T_x \end{bmatrix} = \begin{bmatrix} b_{1,1} & b_{1,2} & \ldots & b_{1,h} \\ b_{2,1} & b_{2,2} & \ldots & b_{2,h} \\ \vdots & \vdots & & \vdots \\ b_{x,1} & b_{x,2} & \ldots & b_{x,h} \end{bmatrix} = [D_1 \; D_2 \; \ldots \; D_h],$$

wherein $S_k$ represents the $k^{th}$ row of sub-matrix storage space; $b_{k,l}$ represents the $k^{th}$ row and $l^{th}$ column memory unit b, $C_q$ represents the $q^{th}$ column of sub-matrix storage spaces C, and $T_k$ represents the $k^{th}$ row of sub-matrix storage spaces T. The value of x can be obtained by calculating the equation (1) below:

$$x = m*(u+v)/w \qquad (1),$$

accordingly, in this embodiment, x=12. The value of h can be obtained by calculating the equation (2) below:

$$h = n*(1+v/u)/x \qquad (2),$$

when $n*(1+v/u)/x$ is an integer, then $h=n*(1+v/u)/x$, thus in this embodiment h=10. However, when $n*(1+v/u)/x$ is not an integer, for example when a horizontal resolution thereof is 352 pixels and n=44, $h=INT(n*(1+v/u)/x)+1$, wherein the function INT( ) is adapted to obtain an integer portion of an input parameter, and therefore it is obtained that h=6. The value of z can be obtained by calculating the equation (3) below:

$$z = n/h \qquad (3),$$

when n/h is an integer, then z=n/h, thus in this embodiment z=8. However, when n/h is not an integer, z=INT(n/h)+1. The value of y can be obtained by calculating the equation (4) below:

$$y = h*z \qquad (4),$$

Accordingly, in this embodiment, it is obtained that y=80. Therefore, according to the embodiment of the present invention, the provided matrix storage spaces B can be described as:

$$B = \begin{bmatrix} S_1 \\ S_2 \\ \vdots \\ S_{12} \end{bmatrix} = \begin{bmatrix} b_{1,1} & b_{1,2} & \ldots & b_{1,80} \\ b_{2,1} & b_{2,2} & \ldots & b_{2,80} \\ \vdots & \vdots & & \vdots \\ b_{12,1} & b_{12,2} & \ldots & b_{12,80} \end{bmatrix} = [C_1 \; C_2 \; \ldots \; C_8],$$

$$C_q = \begin{bmatrix} T_1 \\ T_2 \\ \vdots \\ T_{12} \end{bmatrix} = \begin{bmatrix} b_{1,1} & b_{1,2} & \ldots & b_{1,10} \\ b_{2,1} & b_{2,2} & \ldots & b_{2,10} \\ \vdots & \vdots & & \vdots \\ b_{12,1} & b_{12,2} & \ldots & b_{12,10} \end{bmatrix} = [D_1 \; D_2 \; \ldots \; D_{10}].$$

Then, a step 602 of FIG. 6 is conducted to obtain data of the $2^{nd}$ row of image data sub-matrix R of the $e^{th}$ image data matrix A and store the data to the $(1+0.5)^{th}$ row of sub-matrix storage space S of the matrix storage space B. When writing the data to the $(1+0.5)^{th}$ row of sub-matrix storage space S of the matrix storage space B, the sequence of writing the data to the memory unit $b_{k,l}$ increases from l=1 to l=80. Further, when writing the data to the $(1+0.5)^{th}$ row of sub-matrix storage space S of the matrix storage space B, it starts from the $k^{th}$ row of sub-matrix storage space $S_k$ to store the data of the $(1-0.5)^{th}$ row of the first unit, and the data of the 0.5 row of the second unit and the third unit, wherein k increases from k=1 to k=f, and it starts from the $g^{th}$ row of sub-matrix storage space $S_g$ to store the data of the $0.5^{th}$ row of the first unit, wherein g increases from g=f+1 to g=x, wherein f can be obtained by calculating the equation (5) below, where f and g are natural numbers:

$$f = x*u/(u+V) \qquad (5).$$

Therefore, it can be obtained according to the present embodiment that f=8, and g=9. According to the definition of the YUV420 compression format, in the image data matrixes 701 through 730 as shown in FIG. 7, all odd numbered rows obtain Y, U, and V image component data, while those even numbered rows only obtain Y image component data. Therefore, each two rows of image data, e.g., $a_{1,1}$ through $a_{1,80}$, $a_{2,1}$ through $a_{2,80}$, $a_{3,1}$ through $a_{3,80}$, and $a_{4,1}$ through $a_{4,80}$, and the like, require 1.5 row of sub-matrix storage spaces S of the matrix storage spaces B for storage. The storage is illustrated in FIG. 8 and discussed below.

Figure 8:
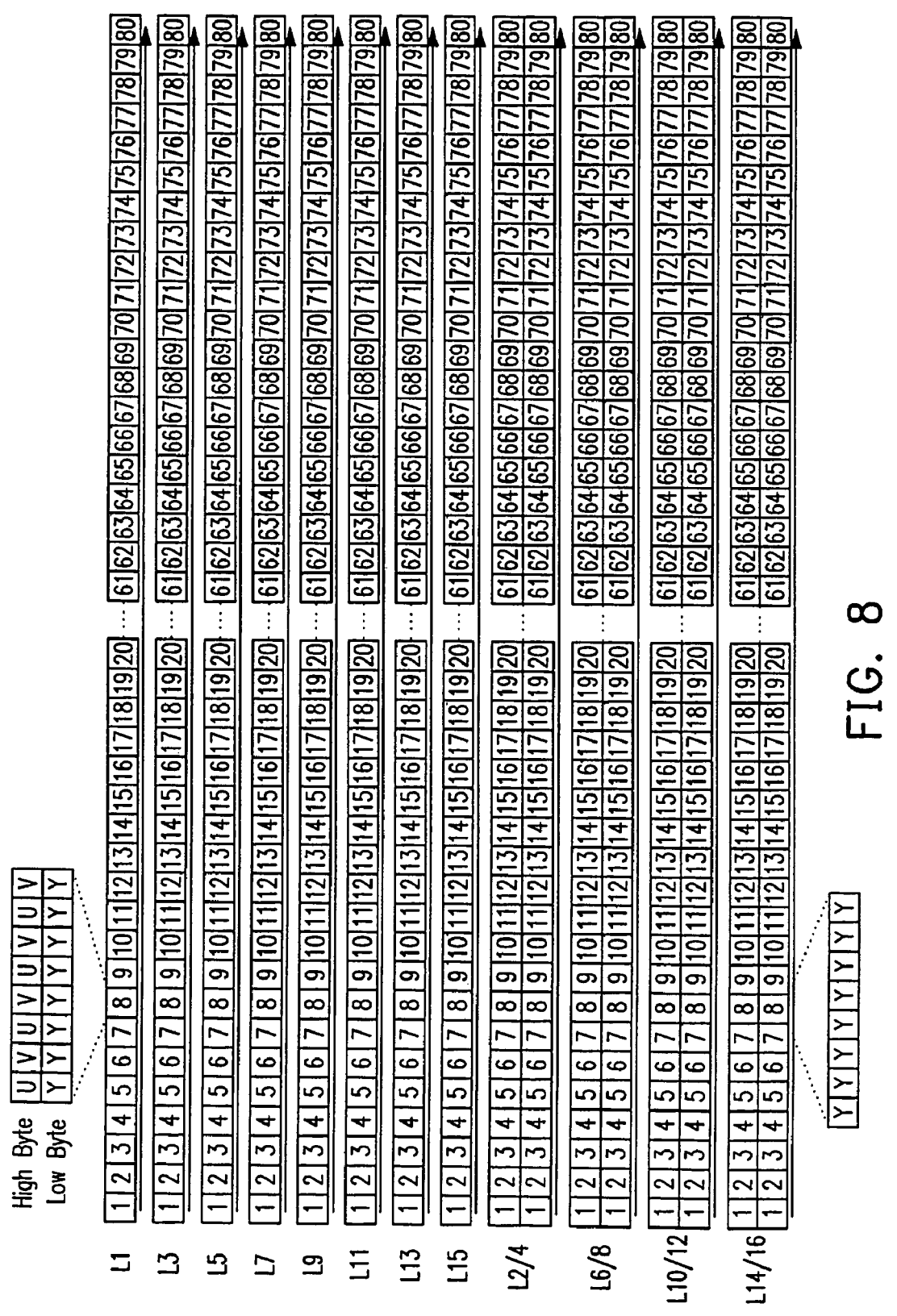

FIG. 8 is a schematic diagram illustrating a step 602 of a method according to an embodiment of the present invention. Referring to FIGS. 6 and 8 and taking the $e^{th}$ image data matrix A, e.g., the image data matrix 701 as shown in FIG. 7, as an example, image data sub-matrix $R_1$, that is $a_{1,1}$ through $a_{1,80}$ of the image data matrix 701 are written in sequence into the memory units 1 through 80 of the storage spaces L1 shown in FIG. 8, that is $b_{1,1}$ through $b_{1,80}$ of the sub-matrix storage spaces $S_1$ of the matrix storage spaces B. The image data sub-matrix $R_2$, that is $a_{2,1}$ through $a_{2,80}$ of the image data matrix 701 are written in sequence into the memory units 1 through 80 of the storage spaces L2 shown in FIG. 8, that is $b_{9,1}$ through $b_{9,80}$ of the sub-matrix storage spaces $S_9$ of the matrix storage spaces B. However, because $b_{9,1}$ through $b_{9,80}$ of $S_9$ has written Y image component data only, therefore only a half of the storage space thereof is used. As such, $b_{9,1}$ through $b_{9,80}$ of $S_9$ still has another half storage space could be used for storing Y image component data. The image data sub-matrix $R_3$, that is $a_{3,1}$ through $a_{3,80}$ of the image data matrix 701 are written in sequence into the memory units 1 through 80 of the storage spaces L3 shown in FIG. 8, that is $b_{2,1}$ through $b_{2,80}$ of the sub-matrix storage spaces $S_2$ of the matrix storage spaces B. The image data sub-matrix $R_4$, that is $a_{4,1}$ through $a_{4,80}$ of the image data matrix 701 are written in sequence into the memory units 1 through 80 of the storage spaces L4 shown in FIG. 8, that is another half storage space of $b_{9,1}$ through $b_{9,80}$ of the sub-matrix storage spaces $S_9$ of the matrix storage spaces B. The other image data of the image data matrix 701 are written in a similar way, and are not to be iterated hereby.

It should be noted that hose skilled in the art may modify the access method according to the teachings of the present invention, which shall be construed to be within the scope of the present invention. For example, when writing the data into the $(1+0.5)^{th}$ row sub-matrix storage spaces S of the matrix storage space B, the data of the first unit are written starting from the $k^{th}$ row of sub-matrix storage space $S_k$, wherein k increases from k=1 to k=f and the data of the second unit and the third unit are written starting from the $g^{th}$ row of sub-matrix storage spaces $S_g$, wherein g increases from g=f+1 to g=x where f can be obtained by calculating the equation (5), and f and g are both natural numbers. In this embodiment, f=8, and g=9, and the accessing method is as illustrated with reference to FIG. 9.

Figure 9:
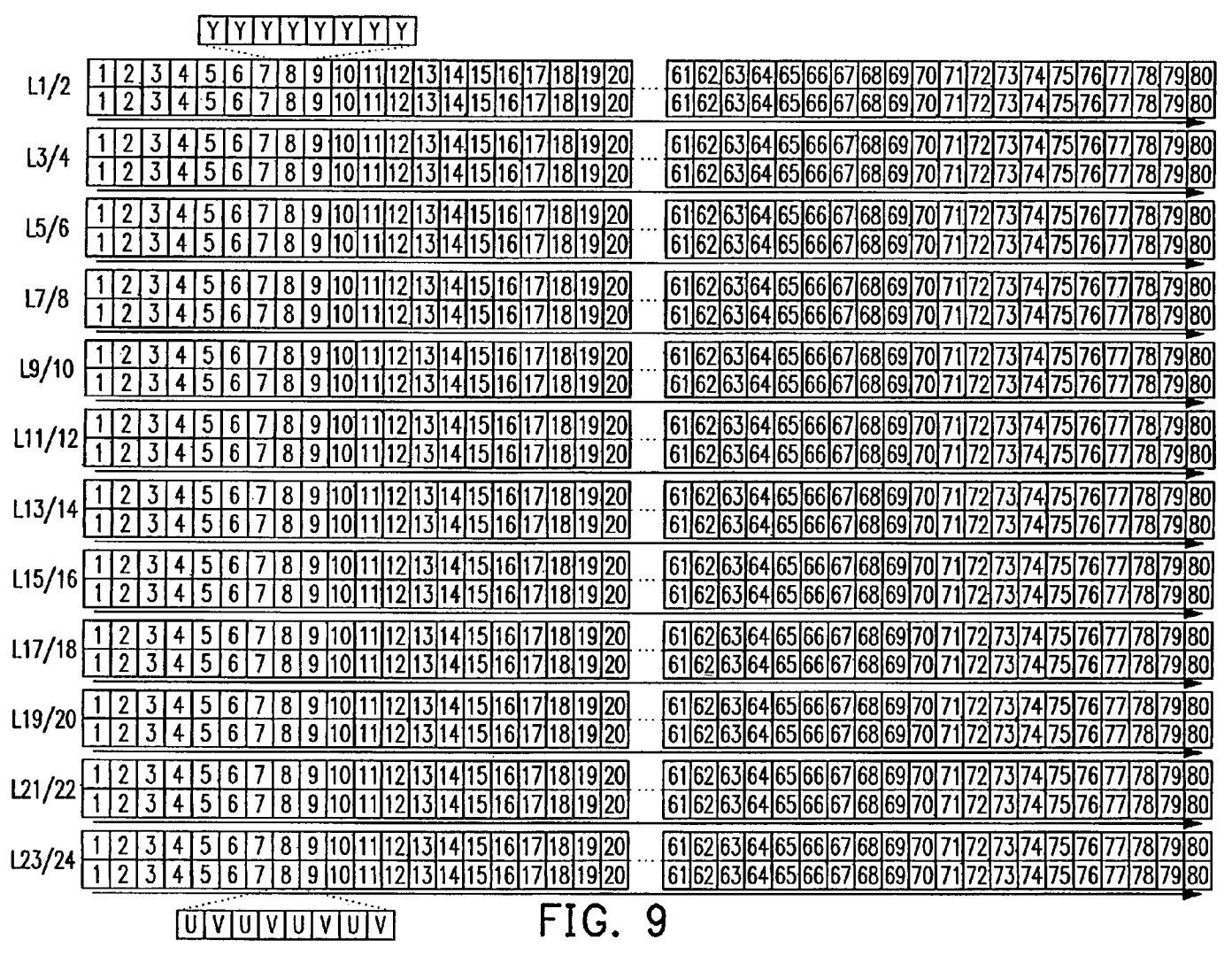

FIG. 9 is a schematic diagram illustrating a step 602 of a method according to another embodiment of the present invention. Referring to FIGS. 6 and 9, taking the eth image data matrix A, e.g., the image data matrix 701 of FIG. 7, as an example, the Y image component data in $a_{1,1}$ through $a_{1,80}$, i.e., image data sub-matrix $R_1$, are written in sequence into the memory units 1 through 80 of the storage space L1 illustrated in FIG. 9, i.e., $b_{1,1}$ through $b_{1,80}$ of the sub-matrix storage space $S_1$ in the matrix storage space B, while only a half of the storage space of $b_{1,1}$ through $b_{1,80}$ of the sub-matrix storage space $S_1$ has been used. The Y image component data in $a_{2,1}$ through $a_{2,80}$, i.e., image data sub-matrix $R_2$, are written in sequence into the memory units 1 through 80 of the storage space L2 illustrated in FIG. 9, i.e., another half of storage space of $b_{1,0}$ through $b_{1,80}$ of the sub-matrix storage space $S_1$ in the matrix storage space B. As such, $b_{1,1}$ through $b_{1,80}$ of the sub-matrix storage space $S_1$ are fully filled. Likewise, the Y image component data of respectively $a_{3,1}$ through $a_{3,80}$, $a_{4,1}$ through $a_{4,80}$, ... $a_{16,1}$ through $a_{16,80}$, are written into the storage spaces L3 through L16 of FIG. 9 in a similar way as discussed-above.

The U and V image component data of $a_{1,1}$ through $a_{1,80}$ in the image data matrix 701, i.e., the image data sub-matrix $R_1$, are written into the storage space L17, i.e., $b_{9,1}$ through $b_{9,80}$ of the sub-matrix storage space $S_9$ in the matrix storage space B, while only a half of the storage space of $b_{9,1}$ through $b_{9,80}$ of the sub-matrix storage space $S_9$ has been used. The U and V image component data of $a_{3,1}$ through $a_{3,80}$ in the image data matrix 701, i.e., the image data sub-matrix $R_3$, are written into the storage space L18, i.e., the other half of the storage space of $b_{9,1}$ through $b_{9,80}$ of the sub-matrix storage space $S_9$. In such a way, all storage space of $b_{9,1}$ through $b_{9,80}$ of the sub-matrix storage space $S_9$ are filled up. Similarly, the U image component and V image component data of other odd rows in the image data matrix 701 are written into the storage spaces L19 through L24 of FIG. 9 in the similar way as discussed above. It is to be noted that although the foregoing step 602 has been described in the embodiment with two possible accessing methods, those of ordinary skill in the art would be able to modify the method according to practical requirements, and the step 602 is not limited as such.

Next, a step 603 of FIG. 6 is conducted, that is to read data of the image data matrix 701, i.e., the $e^{th}$ image data matrix A, from the sub-matrix storage space C in the matrix storage space B, wherein only after data written in the $1^{st}$ row of sub-matrix storage space C have been read, data written in another row of sub-matrix storage space C could be read; and data are read from the sub-matrix storage space D when data are being read from the sub-matrix storage space C of the matrix storage space B. Therefore, the data are read from the sub-matrix storage space C1 through C8 in sequence, and in each sub-matrix storage space C, the data are read from the sub-matrix storage space D1 through D10, when reading data of the image data matrix 701 from the sub-matrix storage space C of the matrix storage space B.

Figure 10A:
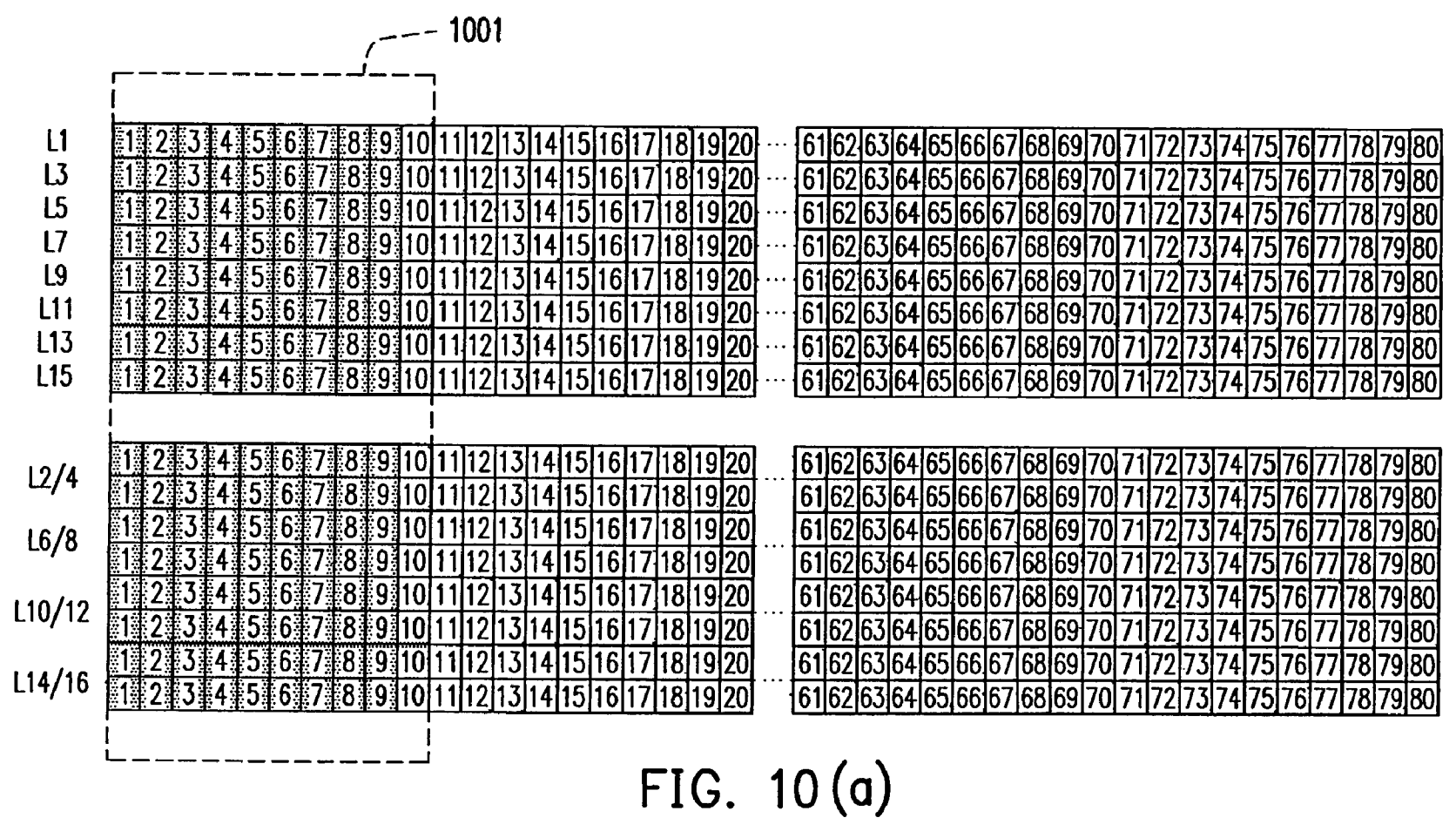
Figure 10B:
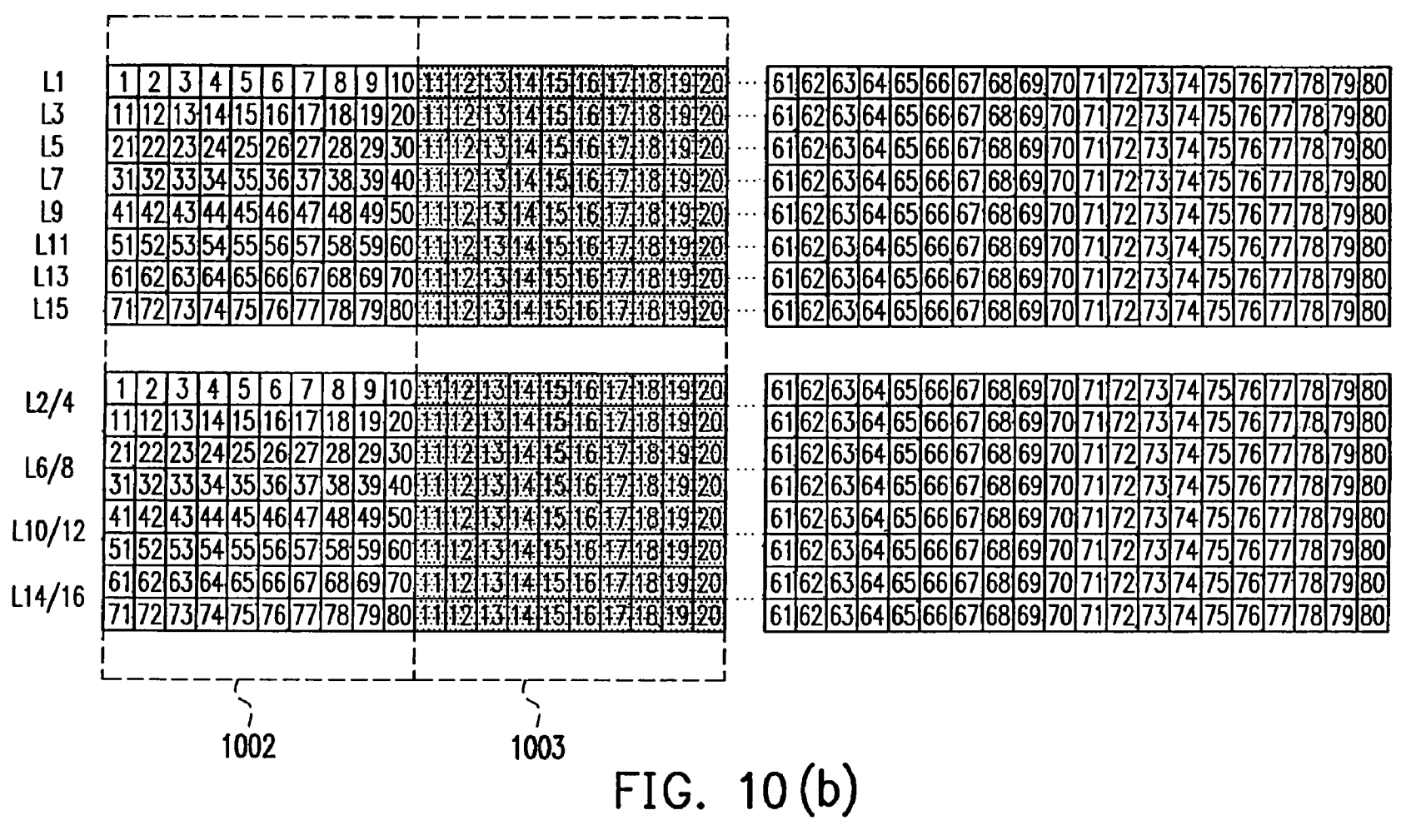

After the data of the sub-matrix storage space C1 have been read out from the matrix storage space B, that means there are data of 30 MCU have been read out from the matrix storage space B for further JPEG compression, as shown in FIG. 10(*a*). FIG. 10(*a*) is a schematic diagram showing 30 MCUs after being compressed according to an embodiment of the present invention. As such, there is enough space for storing the data of the $2^{nd}$ row of image data matrix R of the image data matrix 702, ie, the $(e+1)^{th}$ image data matrix A, as shown in FIG. 7, into the sub-matrix storage space C1 of the matrix storage space B, as illustrated as 1001 shown FIG. 10(*a*), as step 604 as discussed with reference to FIG. 6. The method for writing the data is as illustrated as 1002 in FIG. 10(*b*).

FIG. 10(*b*) is a schematic diagram showing 60 MCUs after being compressed according to an embodiment of the present invention. Referring to FIG. 10(*b*), when data of a sub-matrix storage space C2, e.g., 1003 of FIG. 10, start to be read out from the matrix storage space B, $a_{1,1}$ through $a_{1,80}$ of the image data matrix 702 are written in memory units 1 through 10 of those rows marked with odd numbers, i.e., storage spaces L1, 3, 5, ..., 15, also sub-matrix storage spaces T1 through T8, and $a_{2,1}$ through $a_{2,80}$ of the image data matrix 702 are written in memory units 1 through 10 of those rows marked with even numbers, i.e., storage spaces L2, 4, 6, ..., 16, also sub-matrix storage spaces T9 through T12. As to the other image data of the image data matrix 702, are similarly written into the matrix storage space B in sequence, while the process thereof is not to be iterated hereby. After all image data of the image data matrix 702 have been written into the matrix storage space B, a step 605 can be conducted. The step 605 is to read data of the image data matrix 702, i.e., the $(e+1)^{th}$ image data matrix A, from the $(1+0.5)^{th}$ row of sub-matrix storage spaces S of the matrix storage space B, wherein only after one group of data of the $(1+0.5)^{th}$ row of sub-matrix storage spaces S have been read out, data another $(1+0.5)^{th}$ row of sub-matrix storage spaces S can be started to read. The method for reading is illustrated with reference to FIG. 11.

Figure 11:
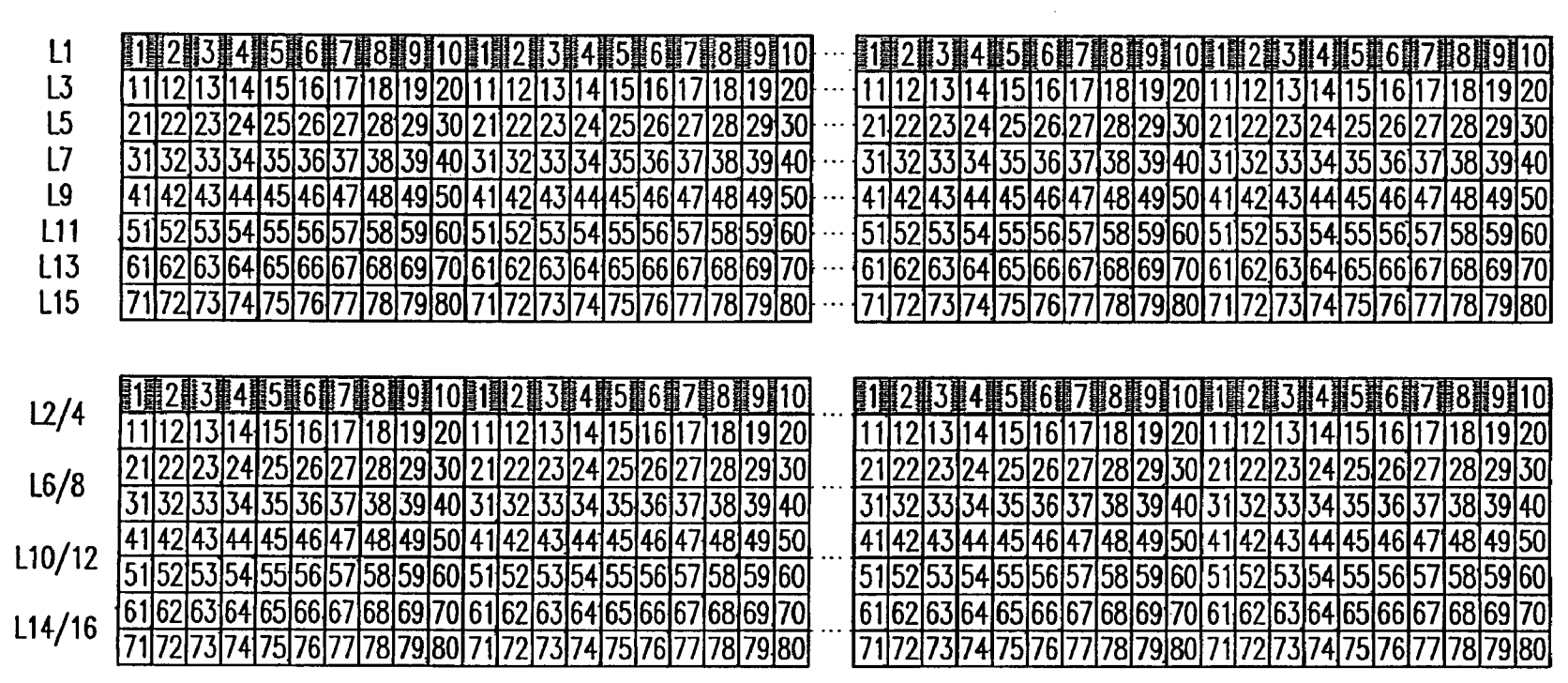

FIG. 11 is a schematic diagram illustrating a step 605 of a method according to an embodiment of the present invention. Referring to FIG. 11, at step 605 data in all memory units that are marked with a same number in the storage space L1 and the storage space L2 is simultaneously read out from the matrix storage space B, for example data written in all of the 16 memory units that are marked with 1 in the storage space L1 and the storage space L2 are read out from the matrix storage space B; and then data written in all of the 16 memory units that are marked with 2 in the storage space L1 and the storage space L2 are read out from the matrix storage space B; ..., until all data written in the storage space L1 and the storage space L2 are read out from the matrix storage space B. Then, the storage space L1 has enough room for storing data $a_{1,1}$ through $a_{1,80}$ of the image data matrix 603, i.e., $(e+2)^{th}$ image data matrix A therein, and the storage space L2 also has enough room for storing data $a_{2,1}$ through $a_{2,80}$ of the image data matrix 603 therein, while returning back to step 602. As such, the method according to the embodiment of the present invention the steps 602, 603, 604, and 605 are performed in sequence until data of all image data matrix 701 through 730 have been temporarily written in the buffer, and finally read out from the buffer for JPEG compression. It is concluded that there is no waiting time needed during the operation process of data accessing as discussed above. The maximum error of the method of the present invention is a period of 30 MCU. Further, with the method as disclosed in the embodiments, YUV420 compression can be achieved by a 12-line buffer.

Although a feasible module of the matrix storage space B is described in this embodiment, those of ordinary skill in the art would understand that manufacturers in the art adopt different compression formats, and thus the matrix storage space B should not be construed as limited to be the module as illustrated above. In other words, regardless of the compression format may be of YUV411, YUV422, or YUV444, or whatever the horizontal resolution and the vertical resolution of the image data are, the matrix storage space B is subject to be modified accordingly, which shall be to be within the scope of the present invention. Those of ordinary skill in the art can conduct instant JPEG compression with a single buffer by employing a buffer corresponding to the memory volume of the matrix storage space B.

Figure 12:
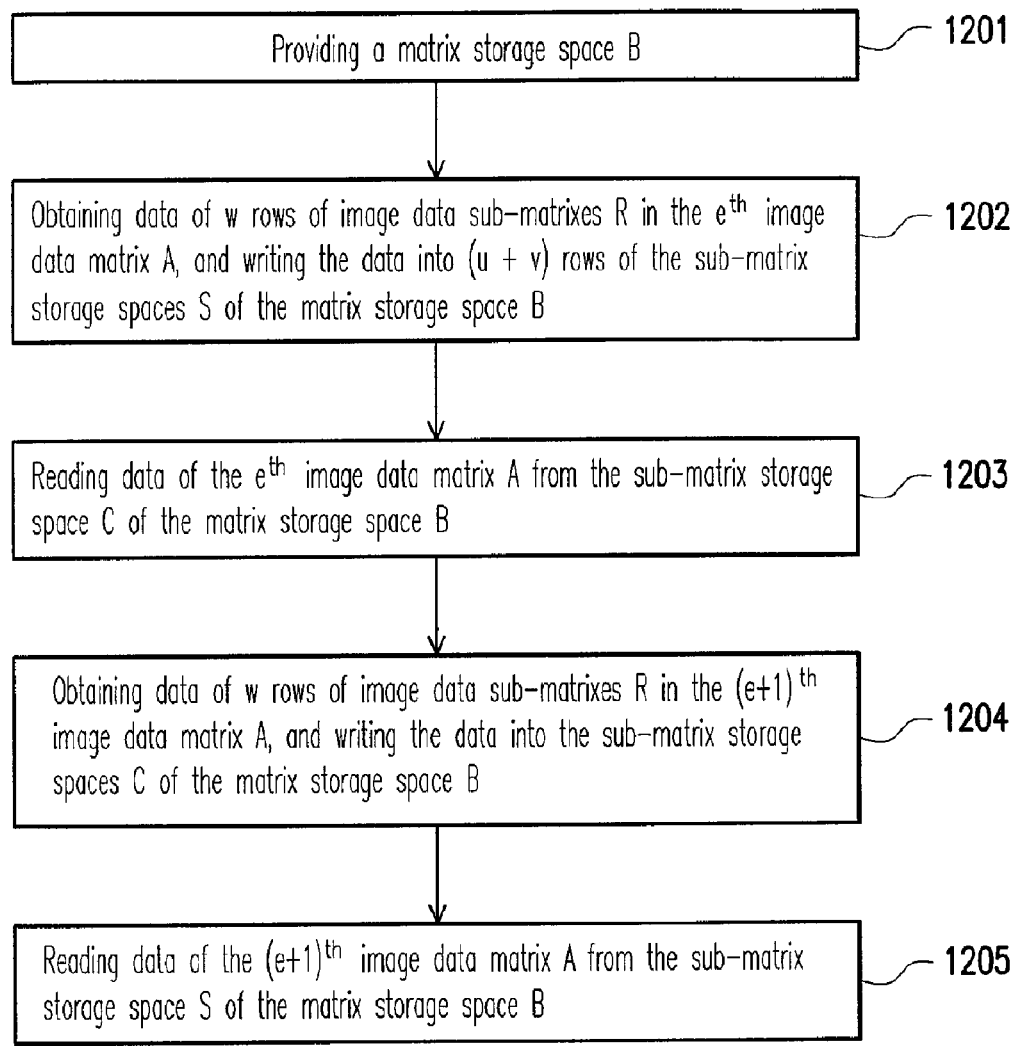
FIG. 12 is a flow chart for illustrating a method for accessing image data according to another embodiment of the present invention.

The embodiment illustrated with reference to FIG. 6 is an approach to avoid using the SDRM. However, in order to avoid data overwriting, speeding up the JPEG engine is necessary when using the method of the present invention. However, when compressing a high resolution image, the power consumption and operation speed thereof probably are not enough. Therefore, the user may perform a JPEG compression with the method of the embodiment of FIG. 12, which does not need speeding up the JPEG engine. The image data discussed in embodiment of FIG. 12 are set as 640×480 pixels. However the method as illustrated by the embodiment with reference to FIG. 12 is limited to YUV420 compression format.

Similar as the embodiment described with reference to FIG. 6, the 640×480 pixels image data include 30 image data matrixes A, that can be also described as 701, 702, . . . , 730 as shown in FIG. 7. Each image data matrix A includes 16 rows of image data sub-matrixes R, and each image data sub-matrix R includes 80 columns of image units a. As such, each image data matrix A can be described as:

$$A = \begin{bmatrix} R_1 \\ R_2 \\ \vdots \\ R_{16} \end{bmatrix} = \begin{bmatrix} a_{1,1} & a_{1,2} & \cdots & a_{1,80} \\ a_{2,1} & a_{2,2} & \cdots & a_{2,80} \\ \vdots & \vdots & & \vdots \\ a_{16,1} & a_{16,2} & \cdots & a_{15,80} \end{bmatrix},$$

wherein $R_i$ represents the $i^{th}$ image data sub-matrix R; $a_{i,j}$ represents the $i^{th}$ row and $j^{th}$ column image unit a. Pixel quantity contained in each image unit a in the image data matrix A, type and unit of the data, as well as the storage space required by those data are not to be iterated hereby. The method for accessing image data is illustrated by a flowchart as shown by FIG. 12 according to another embodiment of the present invention. The method shown in FIG. 12 includes the following steps.

Referring to FIG. 12, first, at step 1201, a buffer is provided for providing a matrix storage space B for temporarily storing the image data matrixes A. The matrix storage space B includes x rows of sub-matrix storage spaces S, while each sub-matrix storage space S includes y columns of memory units b. The matrix storage space B is also described as including z columns of sub-matrix storage spaces C, while each sub-matrix storage space C includes x rows of sub-matrix storage spaces T, and each sub-matrix storage space T includes h columns of memory units b. The matrix storage space C is also described as including h columns of sub-matrix storage spaces D, and the matrix storage space C also includes Y rows of sub-matrix storage spaces E, while each sub-matrix storage spaces E are represented as including 3 rows of sub-matrix storage spaces T. The matrix storage space B is described as:

$$B = \begin{bmatrix} S_1 \\ S_2 \\ \vdots \\ S_x \end{bmatrix} = \begin{bmatrix} b_{1,1} & b_{1,2} & \cdots & b_{1,y} \\ b_{2,1} & b_{2,2} & \cdots & b_{2,y} \\ \vdots & \vdots & & \vdots \\ b_{x,1} & b_{x,2} & \cdots & b_{x,y} \end{bmatrix} = [C_1\ C_2\ \cdots\ C_z],$$

-continued $$C_q = \begin{bmatrix} T_1 \\ T_2 \\ \vdots \\ T_x \end{bmatrix}$$

$$= \begin{bmatrix} b_{1,1} & b_{1,2} & \cdots & \cdots & b_{1,m1} & b_{1,m1+1} & \cdots & b_{1,h} \\ b_{2,1} & b_{2,2} & \cdots & b_{2,m2} & b_{2,m2+1} & \cdots & \cdots & b_{2,h} \\ b_{3,1} & b_{3,2} & \cdots & \cdots & b_{3,m1} & b_{3,m1+1} & \cdots & b_{3,h} \\ b_{4,1} & b_{4,2} & \cdots & \cdots & b_{4,m1} & b_{4,m1+1} & \cdots & b_{4,h} \\ b_{5,1} & b_{5,2} & \cdots & b_{5,m2} & b_{5,m2+1} & \cdots & \cdots & b_{5,h} \\ b_{6,1} & b_{6,2} & \cdots & \cdots & b_{6,m1} & b_{6,m1+1} & \cdots & b_{6,h} \\ \vdots & \vdots & \vdots & \vdots & \vdots & \vdots & & \vdots \\ b_{x-2,1} & b_{x-2,2} & \cdots & \cdots & b_{x-2,m1} & b_{x-2,m1+1} & \cdots & b_{x-2,h} \\ b_{x-1,1} & b_{x-1,2} & \cdots & b_{x-1,m2} & b_{x-1,m2+1} & \cdots & \cdots & b_{x-1,h} \\ b_{x,1} & b_{x,2} & \cdots & \cdots & b_{x,m1} & b_{x,m1+1} & \cdots & b_{x,h} \end{bmatrix}$$

$$= [D_1\ D_2\ \cdots\ D_h]$$

$$= \begin{bmatrix} E_1 \\ E_2 \\ \vdots \\ E_Y \end{bmatrix},$$

$$E_k = \begin{bmatrix} T_{k-1} \\ T_k \\ T_{k+1} \end{bmatrix},$$

wherein $S_k$ represents the $k^{th}$ row of sub-matrix storage space S; $b_{k,l}$ represents the $k^{th}$ row and $l^{th}$ column memory unit b; $C_q$ represents the $q^{th}$ column of sub-matrix storage space C; $D_q$ represents the $q^{th}$ column of sub-matrix storage space D; $T_k$ represents the $k^{th}$ row of sub-matrix storage space T; and $E_k$ represents the $k^{th}$ row of sub-matrix storage space E, wherein values of respectively x, h, z, and y are obtained by calculating equations (1), (2), (3), and (4), as x=12, h=10, z=8, and y=80. As such, the matrix storage space B of the present embodiment can be described as:

$$B = \begin{bmatrix} S_1 \\ S_2 \\ \vdots \\ S_{12} \end{bmatrix} = \begin{bmatrix} b_{1,1} & b_{1,2} & \cdots & b_{1,80} \\ b_{2,1} & b_{2,2} & \cdots & b_{2,80} \\ \vdots & \vdots & & \vdots \\ b_{12,1} & b_{12,2} & \cdots & b_{12,80} \end{bmatrix} = [C_1\ C_2\ \cdots\ C_8],$$

$$C_q = \begin{bmatrix} T_1 \\ T_2 \\ \vdots \\ T_{12} \end{bmatrix}$$

$$= \begin{bmatrix} b_{1,1} & b_{1,2} & \cdots & \cdots & b_{1,m1} & b_{1,m1+1} & \cdots & b_{1,80} \\ b_{2,1} & b_{2,2} & \cdots & b_{2,m2} & b_{2,m2+1} & \cdots & \cdots & b_{2,80} \\ b_{3,1} & b_{3,2} & \cdots & \cdots & b_{3,m1} & b_{3,m1+1} & \cdots & b_{3,80} \\ b_{4,1} & b_{4,2} & \cdots & \cdots & b_{4,m1} & b_{4,m1+1} & \cdots & b_{4,80} \\ b_{5,1} & b_{5,2} & \cdots & b_{5,m2} & b_{5,m2+1} & \cdots & \cdots & b_{5,80} \\ b_{6,1} & b_{6,2} & \cdots & \cdots & b_{6,m1} & b_{6,m1+1} & \cdots & b_{6,80} \\ \vdots & \vdots & \vdots & & \vdots & \vdots & & \vdots \\ b_{10,1} & b_{10,2} & \cdots & \cdots & b_{10,m1} & b_{10,m1+1} & \cdots & b_{10,80} \\ b_{11,1} & b_{11,2} & \cdots & b_{11,m2} & b_{11,m2+1} & \cdots & \cdots & b_{11,80} \\ b_{12,1} & b_{12,2} & \cdots & \cdots & b_{12,m1} & b_{12,m1+1} & \cdots & b_{12,80} \end{bmatrix}$$

$$= [D_1 \; D_2 \; \ldots \; D_{10}].$$

wherein m1 and m2, which will be discussed in detail later, can be obtained by the following method.

first, if n1=(h−(m1+1)+1)*2, and if n2=(h−(m2+1)+1)*2; then the result calculated using equations (5) through (9) is as below:

$$2*h = 3Q + R \quad (5),$$

$$m1 + (n1)/2 = h \quad (6),$$

$$m2 + (n2)/2 = h \quad (7),$$

$$4*(m1 + m2 + m1) = y \quad (8),$$

$$4*(n1 + n2 + n1) = y \quad (9),$$

wherein Q is quotient of (2*h)/3, and R is arithmetical compliment of (2*h)/3Q. It can be obtained by calculating the foregoing equations that R=2, and m1=Q+1, m2=Q, n1=Q, n2=Q+2. As such, it is concluded that in this embodiment, m1=7, m2=6, n1=6, n2=8. However, if the arithmetical compliment of (2*h)/3Q, R=0, then m1=Q, m2=Q, n1=Q, n2=Q, and if the arithmetical compliment of (2*h)/3Q, R=1, then m1=Q, m2=Q+1, n1=Q+1, n2=Q−1. The arithmetical compliment of x/3 is 0, thus Y=4.

Then, at step 1202 is conducted to obtain data of the $2^{nd}$ row of image data sub-matrix R of the $e^{th}$ image data matrix A, and the data is stored to the $(1+0.5)^{th}$ row of sub-matrix storage space S of the matrix storage space B. However, it is to be noted that the step 1202 could also be modified by the using the methods illustrated with reference to FIGS. 8 and 9, and the modification are not to be iterated hereby. In the present embodiment, the step 1202 is conducted in a way as shown in FIG. 13.

Figure 13:
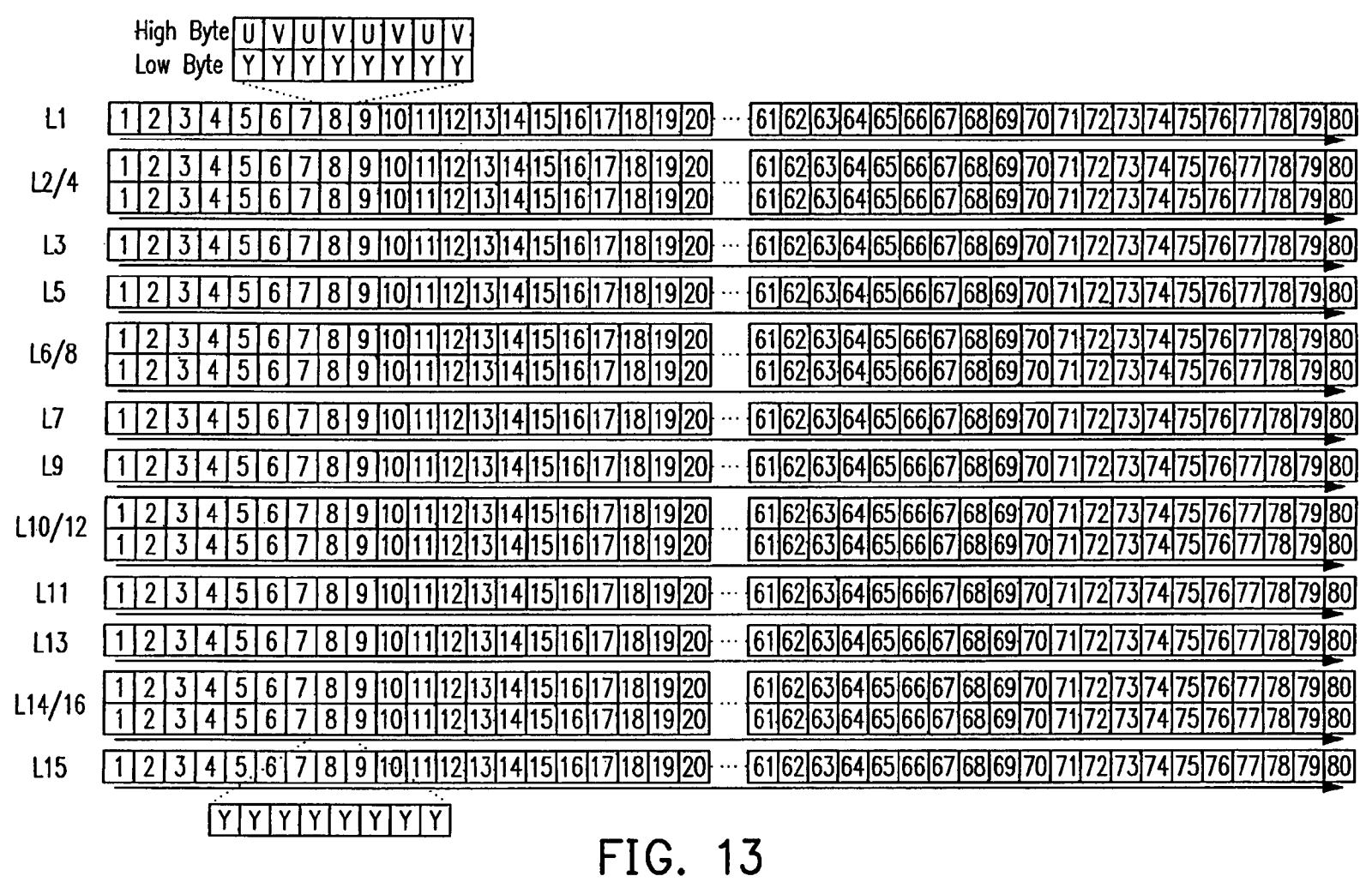

FIG. 13 is a schematic diagram illustrating a step 1202 of a method according to another embodiment of the present invention. Referring to FIGS. 12 and 13 and taking the $e^{th}$ image data matrix A, e.g., the image data matrix 701 of FIG. 7, as an example, $a_{1,1}$ through $a_{1,80}$, i.e., the image data sub-matrix $R_1$, of the image data matrix 701 are written in sequence into the memory units 1 through 80 of the storage space L1 of FIG. 13, i.e., $b_{1,1}$ through $b_{1,80}$ of the sub-matrix storage space $S_1$ of the matrix storage space B, while $a_{2,1}$ through $a_{2,80}$, i.e., the image data sub-matrix $R_2$, of the image data matrix 701 are written in sequence into the memory units 1 through 80 of the storage space L2 of FIG. 13, i.e., $b_{2,1}$ through $b_{2,80}$ of the sub-matrix storage space $S_2$ of the matrix storage space B. However, because $b_{2,1}$ through $b_{2,80}$ of the sub-matrix storage space $S_2$ of the matrix storage space B only store Y image component data therein, so that they still have another half storage space that can be used for storing Y image component data. Similarly, $a_{3,1}$ through $a_{3,80}$, i.e., the image data sub-matrix $R_3$, of the image data matrix 701 are written in sequence into the memory units 1 through 80 of the storage space L3 of FIG. 13, i.e., $b_{3,1}$ through $b_{3,80}$ of the sub-matrix storage space $S_3$ of the matrix storage space B, however $a_{4,1}$ through $a_{4,80}$, i.e., the image data sub-matrix $R_4$, are written in sequence into the memory units 1 through 80 of the storage space L4 of FIG. 13, i.e., another half of the storage space of $b_{2,1}$ through $b_{2,80}$ of the sub-matrix storage space $S_2$ of the matrix storage space B. The other image data of the image data matrix 701 are written in similar way as discussed above and are not to be iterated hereby.

Then, a step 1203 as shown in FIG. 12 is conducted to read data of the image data matrix 701, i.e., the $e^{th}$ image data matrix, wherein only after data of the $1^{st}$ column of sub-matrix storage spaces C have been entirely read out therefrom, data written in another column of sub-matrix storage spaces C would be read. When reading data from the sub-matrix storage space C of the matrix storage space B, the data are read from the sub-matrix storage space D. Accordingly when reading data of the image data matrix 701 from the sub-matrix storage spaces C of the matrix storage space B, the data are read in sequence from the sub-matrix storage spaces C1 through C8, wherein in each sub-matrix storage space C, the data are read in sequence from sub-matrix storage spaces D1 through D10.

Figure 14A:
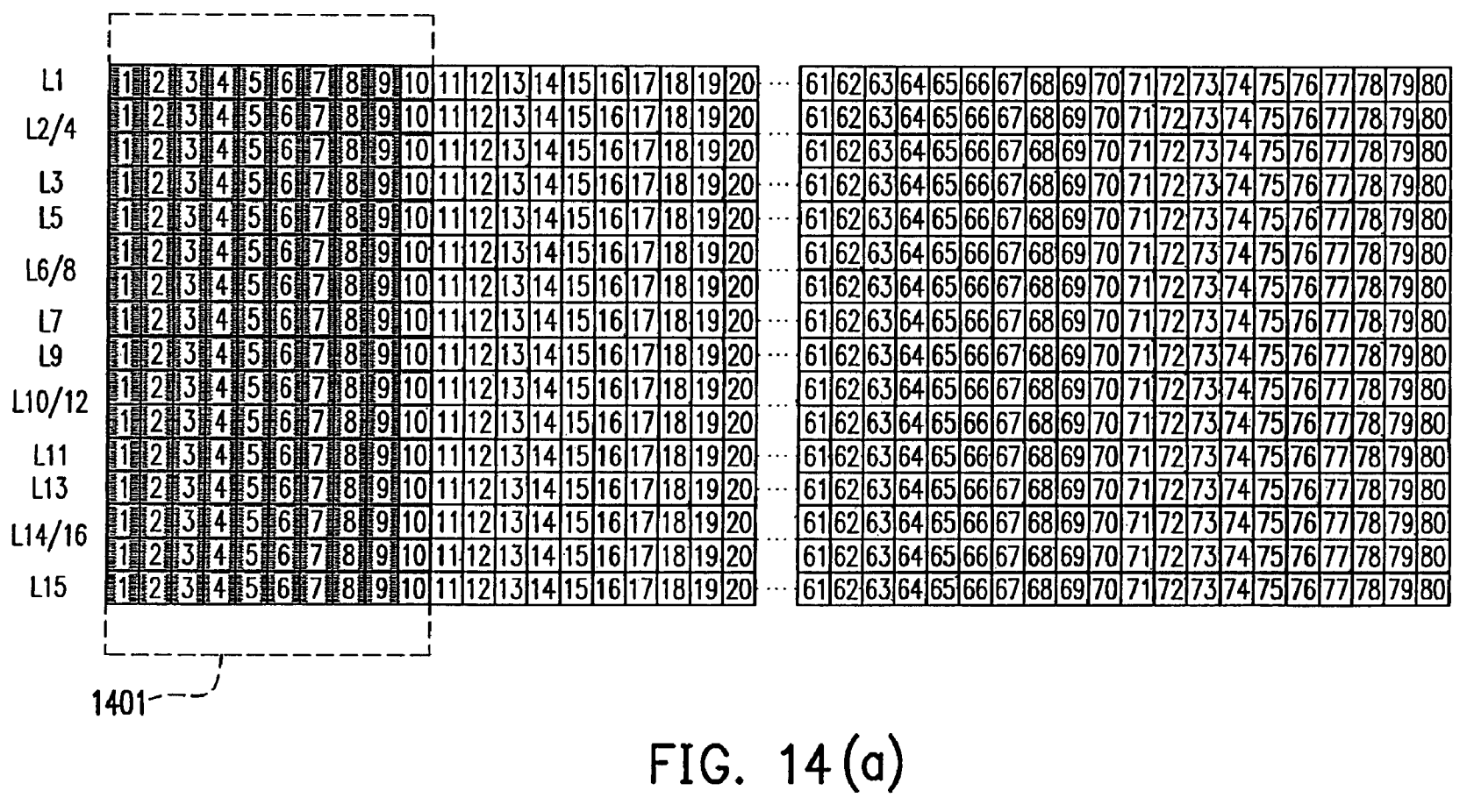

As shown in 1401 in FIG. 14(a), a schematic diagram showing 30 MCUs after being compressed according to another embodiment of the present invention, when the data of the sub-matrix storage space C1 are read out from the matrix storage space B indicating that there are data of 30 MCUs had been read out from the matrix storage space B for JPEG compression. As such, there is enough space for storing data of the $2^{nd}$ row of image data sub-matrix R, i.e., the $(e+1)^{th}$ image data matrix A, of the image data matrix 702 shown in FIG. 7, into the sub-matrix storage space C1 of the matrix storage space B, i.e., as shown as 1401 of FIG. 14(a), which is the step 1204 in FIG. 12. The method for writing is illustrated by 1402 in FIG. 14(b).

Figure 14B:
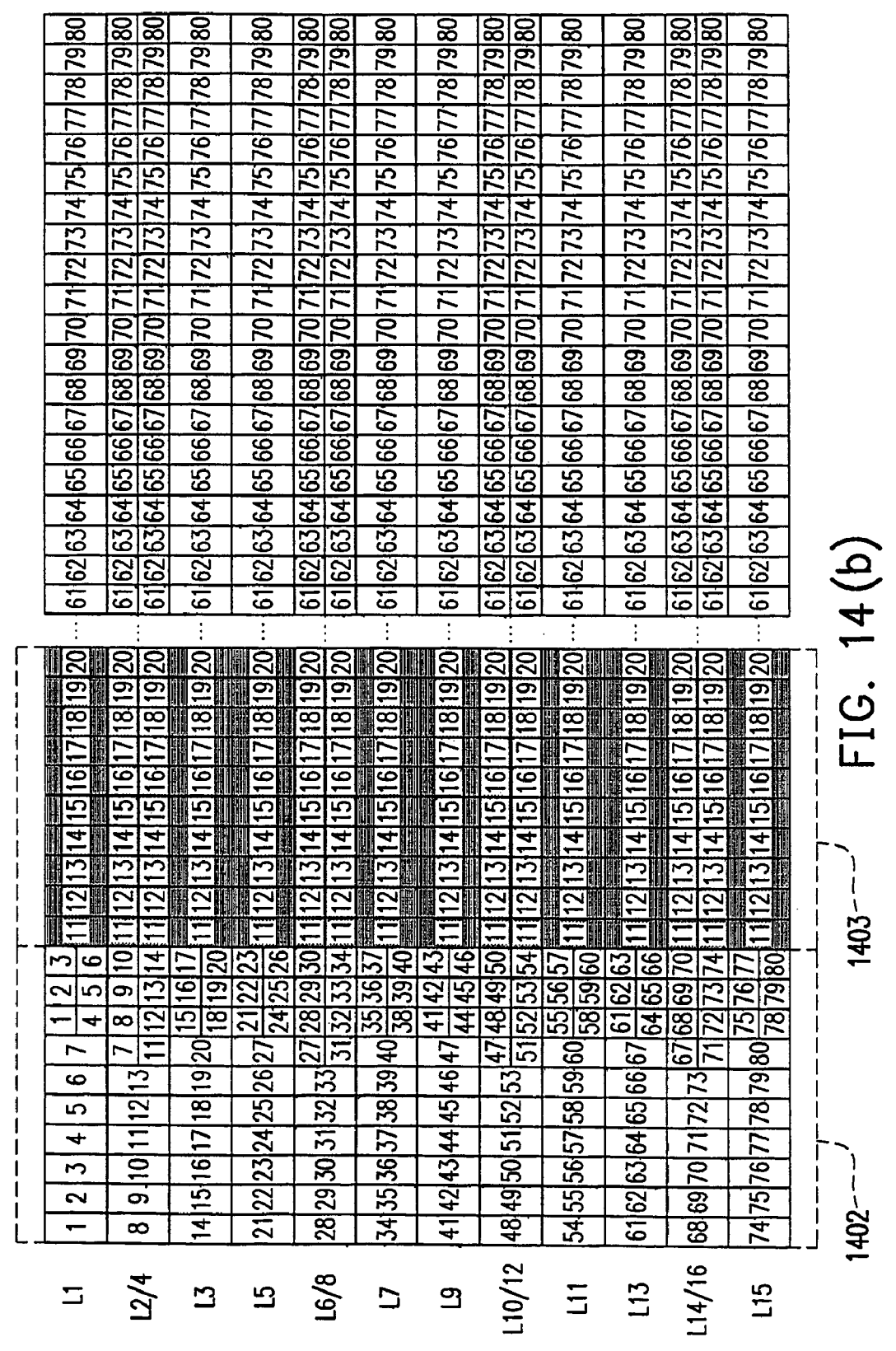

FIG. 14(b) is a schematic diagram showing 60 MCUs after being compressed according to another embodiment of the present invention. When data of the sub-matrix storage space C2, as shown in 1403, are started to be read out from the matrix storage space B, the $(1−0.5)^{th}$ row of Y image component data of the first unit, and the U image component data of the second unit and V image component data of the third unit that are summed to be 0.5 row, contained in $a_{1,1}$ through $a_{1,80}$ of the image data matrix 702 can then be written into memory units $b_{k−1,l}$ through $b_{k−1,m1}$ of the sub-matrix storage space $T_{k−1}$, $b_{k,l}$ through $b_{k,m2}$ of the sub-matrix storage space $T_k$, and $b_{k+1,l}$ through $b_{k+1,m1}$ of the sub-matrix storage space $T_{k+1}$ of the sub-matrix storage space E, wherein m1=7, m2=6. In general, the data $a_{1,1}$ through $a_{1,80}$ of the image data matrix 702 are written into the sub-matrix storage space C1 in sequence according to the numbers marked to the big blocks, i.e., memory units, of 1402.

As such, the remaining storage space of the sub-matrix storage space C1 can be used for storing the 0.5 row of Y component image data of the first unit contained in $a_{2,1}$ through $a_{2,80}$ of the image data matrix 702. The Y component image data of the first unit are written into the memory units $b_{k−1,m1+1}$ through $b_{k−1,h}$ of the sub-matrix storage space $T_{k−1}$, $b_{k,m2+1}$ through $b_{k,h}$ of the sub-matrix storage space $T_k$, and $b_{k+1,m1+1}$ through $b_{k+1,h}$ of the sub-matrix storage space $T_{k+1}$ of the sub-matrix storage space E. In general, the data $a_{2,1}$ through $a_{2,80}$ of the image data matrix 702 are written into the sub-matrix storage space C1 in sequence according to the numbers marked to the small blocks, i.e., half memory units, of 1402. In such a way, the sub-matrix storage space C1 has been fully filled up. As to the other image data of the image data matrix 702, they are to be written into matrix storage spaces C2 through C8 in sequence according to the method of step 1204, and are not to be iterated.

After all image data of the image data matrix 702 have been written into the matrix storage space B, the step 1205 is to be conducted. The step 1205 includes reading data of the image data matrix 702, i.e., the $(e+1)^{th}$ image data matrix A from the sub-matrix storage space S of the matrix storage space B, wherein only after reading all data of one sub-matrix storage space, another sub-matrix storage space would be read. The reading method is as shown in FIG. 15.

Figure 15:
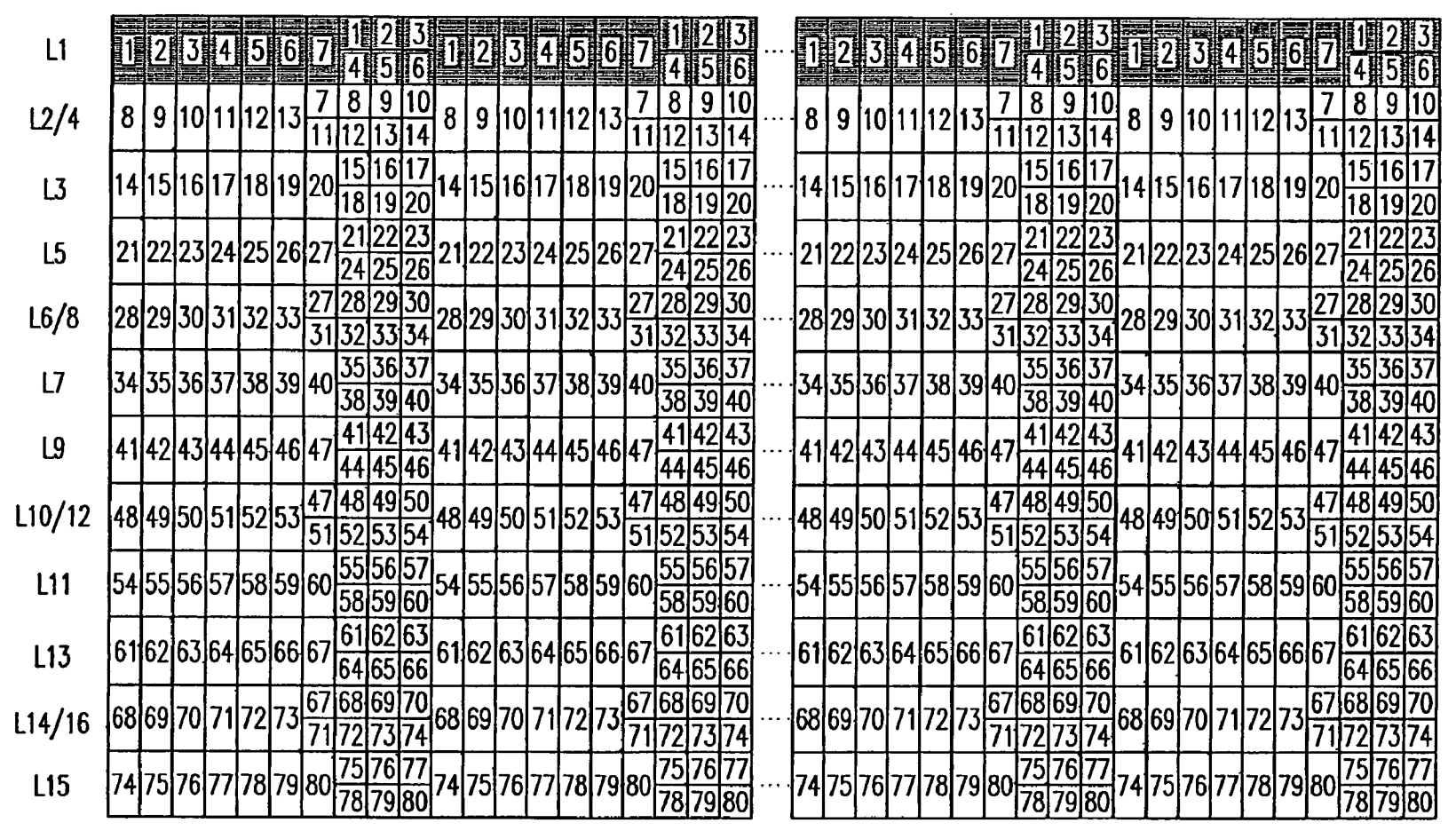

FIG. 15 is a schematic diagram illustrating a step 1205 of a method according to another embodiment of the present invention. Referring to FIG. 15, it shows that the matrix storage space B is fully used up with the image data of the image data matrix 702. As such, data written in the storage space L1, i.e., the sub-matrix storage space S1, can be read therefrom. Therefore, the image data written in the image data matrix 702 are read out from the matrix storage space B in a sequence of storage spaces L1, L2/4, L3, L5, L6/8, L7, L9, L10/12, L11, L13, L14/16, L15. Further, after data written in the storage space L1 have been read out from the matrix storage space B, the storage space L1 again has enough space for storing data $a_{2,1}$ through $a_{2,80}$ of the image data matrix 703, that is to return back to step 1202. The method according to the embodiment of the present invention then repeat the foregoing steps 1202, 1203, 1204 and 1205 until data written in all image data matrixes 701 through 730 are temporarily written in the buffer, and are finally read out from the buffer for further JPEG compression.

Accordingly, no waiting time is needed during the data access operation process as discussed above of the foregoing steps. The maximum error of the method of the present invention is a period of 30 MCU. Further, with the method as disclosed in the embodiments, YUV420 compression can be achieved by a 12-line buffer.

Although a feasible module of the matrix storage space B is described in this embodiment, those of ordinary skill in the art would understand that manufacturers in the art may adopt different compression formats, and thus the matrix storage space B should not be construed as limited to be the module as illustrated above. In other words, regardless of the compression format YUV411, YUV422, or YUV444, or regardless of the horizontal resolution and the vertical resolution of the image data, the matrix storage space B is subject to be modified accordingly, which shall be construed to be within the scope of the present invention. Those of ordinary skill in the art can conduct instant JPEG compression with a single buffer by employing a buffer corresponding to the memory volume of the matrix storage space B.

Figure 16:
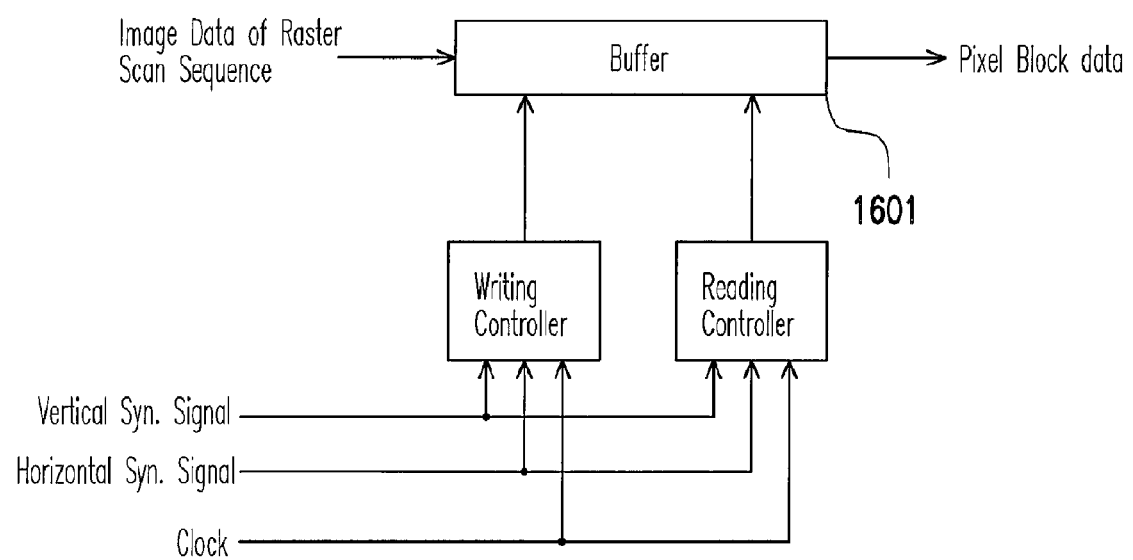
FIG. 16 is a schematic diagram illustrating a hardware structure according to an embodiment of the present invention.

When using the method of the present invention, the use of A/B buffer is not essential, while a single buffer can be employed for realizing same function of accessing image data, as shown in FIG. 16. FIG. 16 is a schematic diagram illustrating a hardware structure according to an embodiment of the present invention. As shown in FIG. 16, the method according to the present invention requires only one 12-line buffer 1601.

In summary, the method of accessing image data according to the present invention uses two different approaches to a buffer for accessing the JPEG image data, so that the method according to the embodiment of the present invention can achieve instant JPEG image data compression with only one buffer.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for accessing image data, the image data comprising a plurality of image data matrixes A, each said image data matrix A comprising m rows of image data sub-matrixes R, each said image data sub-matrix R comprising n columns of image units a, each said image unit a comprising p pixels, each said pixel being represented with a plurality of units of data, the plurality of units comprising a first unit, a second unit and a third unit, wherein data of the first unit of w rows of image data sub-matrixes require u rows, each row comprising n columns, of memory units b for storage, and data of the second unit and the third unit of the w rows of image data sub-matrixes requires v rows, each row comprising n columns of the memory units b for storage, wherein $$A = \begin{bmatrix} R_1 \\ R_2 \\ \vdots \\ R_m \end{bmatrix} = \begin{bmatrix} a_{1,1} & a_{1,2} & \ldots & a_{1,n} \\ a_{2,1} & a_{2,2} & \ldots & a_{2,n} \\ \vdots & \vdots & & \vdots \\ a_{m,1} & a_{m,2} & \ldots & a_{m,n} \end{bmatrix},$$

wherein $R_i$ represents the $i^{th}$ row of image data sub-matrix R; $a_{i,j}$ represents the $i^{th}$ row and $j^{th}$ column image unit a, the method for accessing image data comprising the following steps:

(a) providing a matrix storage space B, for temporarily storing the image data matrixes A, comprising x rows of sub-matrix storage spaces S or z columns of sub-matrix storage spaces C, each said sub-matrix storage space S comprising y columns of the memory units b, each said sub-matrix storage space C comprising x rows of sub-matrix storage spaces T or h columns of sub-matrix storage spaces D, each said sub-matrix storage space T comprising h columns of memory units b, wherein x=m*(u+v)/w, and when n*(1+v/u)/x is an integer, h=n*(1+v/u)/x, and when n*(1+v/u)/x is not an integer, h=INT(n*(1+v/u)/x)+1, wherein the function INT( ) is adapted to obtain an integer portion of an input parameter, and when n/h is an integer, z=n/h, and when n/h is not an integer, z=INT(n/h)+1, and y=h*z, wherein $$B = \begin{bmatrix} S_1 \\ S_2 \\ \vdots \\ S_x \end{bmatrix} = \begin{bmatrix} b_{1,1} & b_{1,2} & \ldots & b_{1,y} \\ b_{2,1} & b_{2,2} & \ldots & b_{2,y} \\ \vdots & \vdots & & \vdots \\ b_{x,1} & b_{x,2} & \ldots & b_{x,y} \end{bmatrix} = [C_1 \; C_2 \; \ldots \; C_z],$$

$$C_q = \begin{bmatrix} T_1 \\ T_2 \\ \vdots \\ T_x \end{bmatrix} = \begin{bmatrix} b_{1,1} & b_{1,2} & \ldots & b_{1,h} \\ b_{2,1} & b_{2,2} & \ldots & b_{2,h} \\ \vdots & \vdots & & \vdots \\ b_{x,1} & b_{x,2} & \ldots & b_{x,h} \end{bmatrix} = [D_1 \; D_2 \; \ldots \; D_h],$$

wherein $S_k$ represents the kth row of sub-matrix storage spaces S, $b_{k,l}$ represents the $k^{th}$ row and $l^{th}$ column memory unit b, $C_q$ represents the $q^{th}$ column of sub-matrix storage spaces C, and $T_k$ represents the $k^{th}$ row of sub-matrix storage spaces T;

(b) obtaining data of w rows of image data sub-matrixes R in the $e^{th}$ image data matrix A, and writing the data into (u+v) rows of the sub-matrix storage spaces S of the matrix storage space B;

(c) reading data of the $e^{th}$ image data matrix A from the sub-matrix storage space C of the matrix storage space B, wherein after data of the one column of sub-matrix storage spaces C are read out completely, data of another column of sub-matrix storage spaces C can be read;

(d) obtaining data of w rows of the image data sub-matrixes R in the $(e+1)^{th}$ image data matrix A, and writing the data into the sub-matrix storage spaces C of the matrix storage space B; and (e) reading data of the $(e+1)^{th}$ image data matrix A from the (u+v) rows of sub-matrix storage space S of the matrix storage space B, wherein after data of the one group of (u+v) rows of sub-matrix storage space S are read out completely, data of another group of (u+v) rows of sub-matrix storage space S can be read, wherein e, h, I, j, k, l, m, n, p, q, x, y, and z are natural numbers; w, u, v are rational numbers; and $i \leq m$, $j \leq n$, $k \leq x$, $l \leq y$, and $q \leq z$.

2. The method for accessing image data according to claim 1, wherein when writing data into the (u+v) rows of sub-matrix storage spaces S of the matrix storage space B, a sequence of writing the data into the memory unit $b_{k,l}$ increases from l=1 to l=n, and when reading the data from the sub-matrix storage spaces C of the matrix storage space B, the data are read from the sub-matrix storage spaces D.

3. The method for accessing image data according to claim 2, wherein when writing data into the (u+v) rows of sub-matrix storage spaces S of the matrix storage space B, (u−v) rows of data of the first unit, and v rows of data of the second unit and the third unit are written starting from the $k^{th}$ row of sub-matrix storage spaces $S_k$, wherein k increases from k=1 to k=f, and v rows of data of the first unit are written starting from the $g^{th}$ row of sub-matrix storage spaces $S_g$, wherein g increases from g=f+1 to g=x, wherein f=x*u/(u+v), and f and g are both natural numbers.

4. The method for accessing image data according to claim 2, wherein when writing data into the (u+v) rows of sub-matrix storage spaces S of the matrix storage space B, data of the first unit are written starting from the $k^{th}$ row of sub-matrix storage spaces $S_k$, wherein k increases from k=1 to k=f, and data of the second unit and the third unit are written starting from the $g^{th}$ row of sub-matrix storage spaces $S_g$, wherein g increases from g=f+1 to g=x, wherein f=x*u/(u+v), and f and g are both natural numbers.

5. The method for accessing image data according to claim 1, wherein when writing the data into the sub-matrix storage spaces C of the matrix storage space B, a sequence of writing the data into the memory units $b_{k,l}$ first increases l from l=1 to l=h, then increases k, and when reading data from (u+v) rows of sub-matrix storage spaces S of the matrix storage space B, the data are read from corresponding memory units $b_{k,l}$ of the sub-matrix storage spaces C, and the reading sequence of the sub-matrix storage spaces $C_q$ increases q from q=1 to q=z.

6. The method for accessing image data according to claim 1, wherein p=8, m=16, n=80, w=2, u=1, v=½, x=12 and y=80.

7. The method for accessing image data according to claim 1, wherein the data of the first unit are Y image component data, the data of the second unit are U image component data, and the data of the third unit are V image component data.

8. A method for accessing YUV420 image data, the YUV420 image data comprising a plurality of image data matrixes A, each said image data matrix A comprising m rows of image data sub-matrixes R, each said image data sub-matrix R comprising n columns of image units a, each said image unit a comprising p pixels, each pixel being represented with a plurality of units of data, the plurality of units comprising a first unit, a second unit and a third unit, wherein data of the first unit of w rows of image data sub-matrixes require u rows of memory units b for storage, and data of the second unit and the third unit of the w rows of image data sub-matrixes requires v rows of the memory units b for storage, wherein $$A = \begin{bmatrix} R_1 \\ R_2 \\ \vdots \\ R_m \end{bmatrix} = \begin{bmatrix} a_{1,1} & a_{1,2} & \cdots & a_{1,n} \\ a_{2,1} & a_{2,2} & \cdots & a_{2,n} \\ \vdots & \vdots & & \vdots \\ a_{m,1} & a_{m,2} & \cdots & a_{m,n} \end{bmatrix},$$

wherein $R_i$ represents the $i^{th}$ row of image data sub-matrix R; $a_{i,j}$ represents the $i^{th}$ row and $j^{th}$ column image unit a, the method for accessing YUV420 image data comprising the following steps:

(f) providing a matrix storage space B, for temporarily storing the image data matrixes A, the matrix storage space B comprising x rows of sub-matrix storage spaces S or z columns of sub-matrix storage spaces C, each said sub-matrix storage space S comprising y columns of the memory units b, each said sub-matrix storage space C comprising x rows of sub-matrix storage spaces T or h columns of sub-matrix storage spaces D, each said sub-matrix storage space T comprising h columns of memory units b, each said matrix storage space C further comprising Y rows of sub-matrix storage spaces E, and each said sub-matrix storage space E comprising three rows of sub-matrix storage spaces T, wherein x=m*(u+v)/w, and when n*(1+v/u)/x is an integer, h=n*(1+v/u)/x, and when n*(1+v/u)/x is not an integer, h=INT(n*(1+v/u)/x)+1, wherein the function INT( ) is adapted to obtain an integer portion of an input parameter, and when n/h is an integer, z=n/h, when n/h is not an integer, z=INT(n/h)+1, and y=h*z, when an arithmetical compliment of (2*h)/3Q is zero, then m1=Q and m2=Q; when an arithmetical compliment of (2*h)/3Q is one, then m1=Q and m2=Q+1; and when an arithmetical compliment of (2*h)/3Q is two, then m1=Q+1 and m=Q, wherein Q is a quotient of (2*h)/3, and when an arithmetical compliment of x/3 is zero, then Y=x/3, wherein $$B = \begin{bmatrix} S_1 \\ S_2 \\ \vdots \\ S_x \end{bmatrix} = \begin{bmatrix} b_{1,1} & b_{1,2} & \cdots & b_{1,y} \\ b_{2,1} & b_{2,2} & \cdots & b_{2,y} \\ \vdots & \vdots & & \vdots \\ b_{x,1} & b_{x,2} & \cdots & b_{x,y} \end{bmatrix} = [C_1 \; C_2 \; \cdots \; C_z],$$

$$C_q = \begin{bmatrix} T_1 \\ T_2 \\ \vdots \\ T_x \end{bmatrix}$$

$$= \begin{bmatrix} b_{1,1} & b_{1,2} & \cdots & \cdots & b_{1,m1} & b_{1,m1+1} & \cdots & b_{1,h} \\ b_{2,1} & b_{2,2} & \cdots & b_{2,m2} & b_{2,m2+1} & \cdots & \cdots & b_{2,h} \\ b_{3,1} & b_{3,2} & \cdots & \cdots & b_{3,m1} & b_{3,m1+1} & \cdots & b_{3,h} \\ b_{4,1} & b_{4,2} & \cdots & \cdots & b_{4,m1} & b_{4,m1+1} & \cdots & b_{4,h} \\ b_{5,1} & b_{5,2} & \cdots & b_{5,m2} & b_{5,m2+1} & \cdots & \cdots & b_{5,h} \\ b_{6,1} & b_{6,2} & \cdots & \cdots & b_{6,m1} & b_{6,m1+1} & \cdots & b_{6,h} \\ \vdots & \vdots & \vdots & \vdots & \vdots & \vdots & \vdots & \vdots \\ b_{x-2,1} & b_{x-2,2} & \cdots & \cdots & b_{x-2,m1} & b_{x-2,m1+1} & \cdots & b_{x-2,h} \\ b_{x-1,1} & b_{x-1,2} & \cdots & b_{x-1,m2} & b_{x-1,m2+1} & \cdots & \cdots & b_{x-1,h} \\ b_{x,1} & b_{x,2} & \cdots & \cdots & b_{x,m1} & b_{x,m1+1} & \cdots & b_{x,h} \end{bmatrix}$$

$$= [D_1 \ D_2 \ \ldots \ D_h]$$

$$= \begin{bmatrix} E_1 \\ E_2 \\ \vdots \\ E_Y \end{bmatrix},$$

$$E_k = \begin{bmatrix} T_{k-1} \\ T_k \\ T_{k+1} \end{bmatrix},$$

wherein $S_k$ represents kth sub-matrix storage spaces S, $b_{k,l}$ represents the $k^{th}$ row and $l^{th}$ column memory unit b, $C_q$ represents the $q^{th}$ column of sub-matrix storage spaces C, $D_q$ represents the $q^{th}$ column of sub-matrix storage spaces D; $T_k$ represents the $k^{th}$ row of sub-matrix storage spaces T; and $E_k$ represents the $k^{th}$ row of sub-matrix storage spaces E;

(g) obtaining data of w rows of image data sub-matrixes R in the $e^{th}$ image data matrix A, and writing data into (u+v) rows of the sub-matrix storage spaces S of the matrix storage space B;

(h) reading data of the $e^{th}$ image data matrix A from the sub-matrix storage space C of the matrix storage space B, wherein after data of the one column of sub-matrix storage spaces C are read out completely, data of another column of sub-matrix storage spaces C can be read;

(i) obtaining data of w rows of image data sub-matrixes R in the $(e+1)^{th}$ image data matrix A, and writing the data into the sub-matrix storage spaces C of the matrix storage space B; and (j) reading data of the $(e+1)^{th}$ image data matrix A from the sub-matrix storage space S of the matrix storage space B, wherein e, h, I, j, k, l, m, n, p, q, x, y, z, m1, m2, and Q are natural numbers;

w, u, v are rational numbers; and $i \leq m$, $j \leq n$, $k \leq x$, $l \leq y$, and $q \leq z$.

9. The method for accessing YUV420 image data according to claim 8, wherein when writing data into the (u+v) rows of sub-matrix storage spaces S of the matrix storage space B, a sequence of writing the data into the memory unit bk,l increases from l=1 to l=n, and when reading the data from the sub-matrix storage spaces C of the matrix storage space B, the data are read from the sub-matrix storage spaces D.

10. The method for accessing YUV420 image data according to claim 9, wherein when writing data into the (u+v) rows of sub-matrix storage spaces S of the matrix storage space B, (u−v) rows of data of the first unit, and v rows of data of the second unit and the third unit are written starting from the $k^{th}$ row of sub-matrix storage spaces $S_k$, wherein k increases from k=1 to k=f, and v rows of data of the first unit are written starting from the $g^{th}$ row of sub-matrix storage spaces $S_g$, wherein g increases from g=f+1 to g=x, wherein f=x*u/(u+v), and f and g are both natural numbers.

11. The method for accessing YUV420 image data according to claim 9, wherein when writing data into the (u+v) rows of sub-matrix storage spaces S of the matrix storage space B, data of the first unit are written starting from the kth row of sub-matrix storage spaces $S_k$, wherein k increases from k=1 to k=f, and data of the second unit and the third unit are written starting from the $g^{th}$ row of sub-matrix storage spaces $S_g$, wherein g increases from g=f+1 to g=x, wherein f=x*u/(u+v), and f and g are both natural numbers.

12. The method for accessing YUV420 image data according to claim 8, wherein when writing the data into the sub-matrix storage spaces C of the matrix storage space B, the (u−v) rows of data of the first unit and the v rows of data of the second and the third units are written into the memory units $b_{k-1,l}$ through $b_{k-1,m1}$ of the sub-matrix storage space $T_{k-1}$, $b_{k,l}$ through $b_{k,m2}$ of the sub-matrix storage space $T_k$, and $b_{k+1,l}$ through $b_{k+1,m1}$ of the sub-matrix storage space $T_{k+1}$ of the sub-matrix storage space E.

13. The method for accessing YUV420 image data according to claim 12, wherein when writing the data into the sub-matrix storage spaces C of the matrix storage space B, the v rows of data of the first unit are written into the memory units $b_{k-1,m1+1}$ through $b_{k-1,h}$ of the sub-matrix storage space $T_{k-1}$, $b_{k,m2+1}$ through $b_{k,h}$ of the sub-matrix storage space $T_k$, and $b_{k+1,m1+1}$ through $b_{k+1,h}$ of the sub-matrix storage space $T_{k+1}$ of the sub-matrix storage space E.

14. The method for accessing YUV420 image data according to claim 8, wherein p=8, m=16, n=80, w=2, u=1, v=½, x=12 and y=80.

15. The method for accessing YUV420 image data according to claim 14, wherein when writing data into the (u+v) rows of sub-matrix storage spaces S of the matrix storage space B, the (u−v) rows of data of the first unit and the v rows of data of the second and the third units are written from the $k^{th}$ row of sub-matrix storage spaces $S_k$, wherein k is 1, 3, 4, 6, 7, 9, 10, and 12, and the v rows of data of the first unit are written from the $g^{th}$ row of sub-matrix storage spaces $S_g$, wherein g is 2, 5, 8, and 11.

16. The method for accessing YUV420 image data according to claim 8, wherein the data of the first unit are Y image component data, the data of the second unit are U image component data, and the data of the third unit are V image component data.

* * * * *